(12) United States Patent
Ryuen et al.

(10) Patent No.: US 7,049,916 B2
(45) Date of Patent: May 23, 2006

(54) ELECTROMAGNETIC APPARATUS

(75) Inventors: Shigeto Ryuen, Sendai (JP); Takahiro Nagaoka, Kakuda (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 11/041,762

(22) Filed: Jan. 21, 2005

(65) Prior Publication Data

US 2005/0184841 A1 Aug. 25, 2005

(30) Foreign Application Priority Data

Jan. 21, 2004 (JP) ............................. 2004-012762
Mar. 22, 2004 (JP) ............................. 2004-082443

(51) Int. Cl.
*H01F 7/08* (2006.01)
(52) U.S. Cl. ..................................... 335/251
(58) Field of Classification Search ................ 336/212, 336/220–222; 335/220–230, 251, 261
See application file for complete search history.

(56) References Cited

U.S. PATENT DOCUMENTS 2,239,312 A * 4/1941 Berges ........................ 335/263
5,746,412 A * 5/1998 Niimi ..................... 251/129.15
5,992,822 A * 11/1999 Nakao et al. ........... 251/129.15
2002/0113677 A1* 8/2002 Holmes et al. .............. 335/256
2003/0184422 A1* 10/2003 Matsusaka et al. ......... 335/220
2005/0211938 A1 9/2005 Ryuen
2005/0218362 A1 10/2005 Furuta
2005/0218363 A1 10/2005 Furuta

FOREIGN PATENT DOCUMENTS

| JP | 63-56371 | 4/1988 |
|---|---|---|
| JP | 6-14415 | 4/1994 |
| JP | 06-302237 | 10/1994 |
| JP | 2001-329928 | 11/2001 |
| JP | 2002-307104 | 10/2002 |
| JP | 2002-310328 | 10/2002 |

* cited by examiner

*Primary Examiner*—Tuyen T Nguyen
(74) *Attorney, Agent, or Firm*—Lahive & Cockfield, LLP; Anthony A. Laurentano, Esq.

(57) ABSTRACT

An electromagnetic apparatus includes a solenoid having a movable core for being attracted to a fixed core when a coil is energized, a shaft coupled to the movable core for displacement in unison with the movable core, and a valve mechanism having a ball for selectively opening and closing a passageway between an inlet port and an outlet port in response to the displacement of the shaft. The movable core has a nonmagnetic layer formed on an outer surface thereof and having a predetermined thickness.

5 Claims, 26 Drawing Sheets

ELECTROMAGNETIC APPARATUS

BACKGROUND OF THE INVENTION

1. Field of the Invention

The present invention relates to an electromagnetic apparatus for displacing a valve element by attracting a movable core to a fixed core under electromagnetic forces generated when a solenoid coil is energized, or for moving a movable member by attracting the movable core to the fixed core under the electromagnetic forces.

2. Description of the Related Art

Heretofore, there have been used in the art electromagnetic valves having a valve element which is displaced by attracting a movable core to a fixed core under electromagnetic forces generated when a solenoid coil is energized.

For example, Japanese Laid-Open Utility Model Publication No. 63-56371 discloses an electromagnetic valve having a movable core which is coated on its entire surface with a nonmagnetic, highly wear-resistant thin film for the purpose of minimizing reduction in the flux density of the magnetic circuit.

However, because the thin film is applied to the entire surface of the movable core which has a certain diameter, the outside diameter of the movable core of the disclosed electromagnetic valve is increased by the thickness of the thin film. Consequently, not only the outside diameter of the movable core, but also the thickness of the applied thin film needs to be controlled with care.

Furthermore, it is necessary to prevent the thin film applied to the entire surface of the movable core from peeling off or swelling.

SUMMARY OF THE INVENTION

It is a general object of the present invention to provide an electromagnetic apparatus which requires no nonmagnetic thin-film coating and has a highly accurate magnetic gap.

Another object of the present invention is to provide an electromagnetic apparatus comprising an electromagnetic valve which requires no nonmagnetic thin-film coating and has a highly accurate magnetic gap.

Still another object of the present invention is to provide an electromagnetic apparatus comprising an electromagnetic actuator which requires no nonmagnetic thin-film coating and has a highly accurate magnetic gap.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
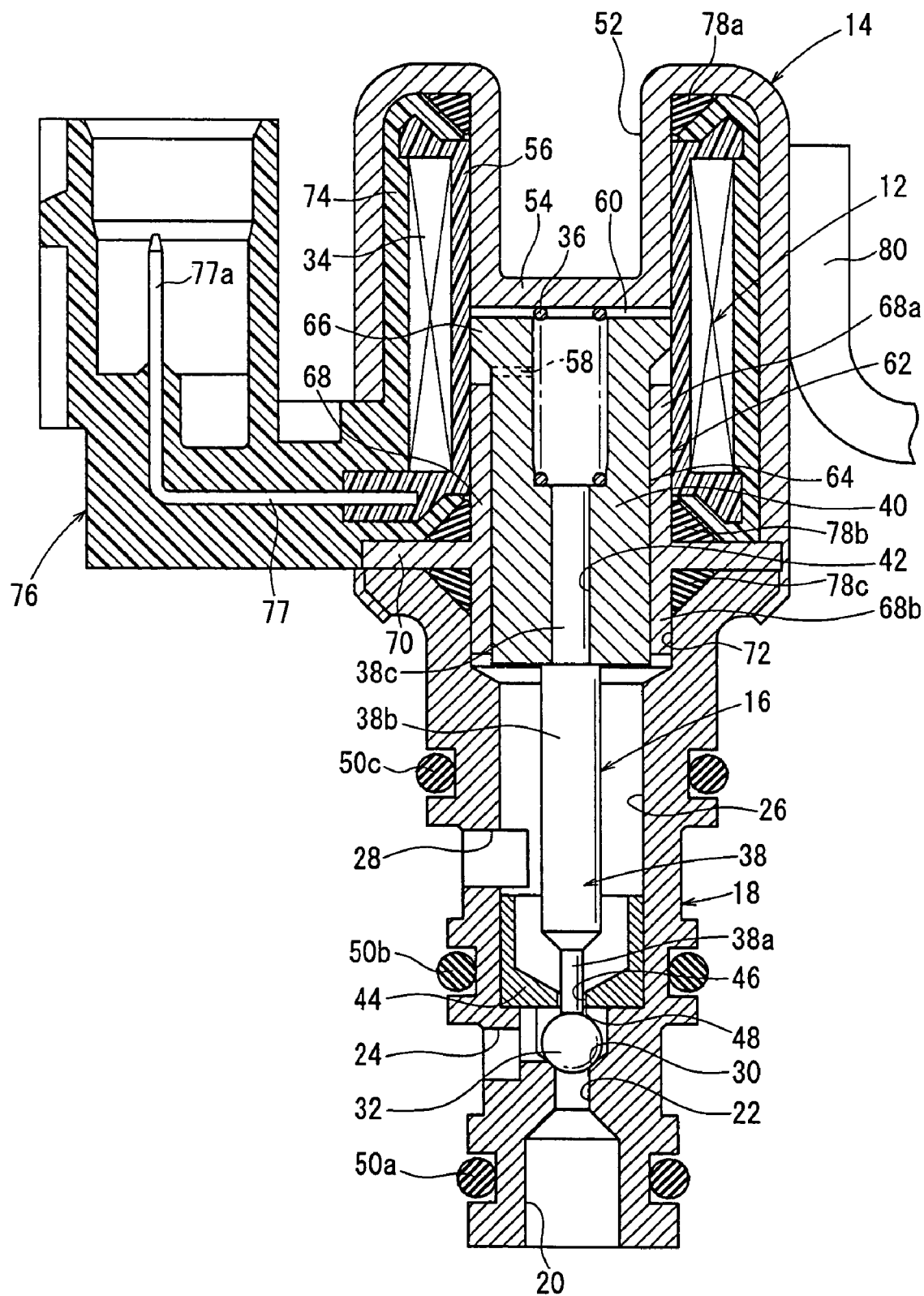
FIG. 1 is a longitudinal cross-sectional view of an electromagnetic valve according to an embodiment of the present invention, the view being taken along an axial direction of the electromagnetic valve.

FIG. 1 shows in longitudinal cross section an electromagnetic valve 10 according to an embodiment of the present invention.

As shown in FIG. 1, the electromagnetic valve 10 comprises a housing 14 with a solenoid 12 disposed therein and a valve body 18 integrally coupled to the housing 14 and housing a valve mechanism 16 therein. The housing 14 and the valve body 18 jointly function as an electromagnetic valve assembly. The housing 14 is made of a magnetic material such as SUM (JIS) or the like, and the valve body 18 is made of a nonmagnetic material such as aluminum or the like.

The valve body 18 is substantially in the form of a hollow cylinder, and has an inlet port 20 defined in a lower end thereof for introducing a fluid under pressure, such as oil under pressure, and an outlet port 24 defined in a side wall thereof slightly above the inlet port 20 and held in fluid communication with the inlet port 20 through a passageway 22. The valve body 18 also has a discharge port 28 defined in a side wall thereof above the outlet port 24 and held in fluid communication with a space 26 which is defined in and extends axially through the valve body 18.

The passageway 22 accommodates therein a ball 32 functioning as a valve element for closing the passageway 22 when seated on a lower seat 30 on an inner wall of the valve body 18 and opening the passageway 22 when unseated off the lower seat 30. The ball 32 may be made of bearing steel such as SUJ (JIS), for example. When a coil 34 (described later) of the solenoid 12 is de-energized, the ball 32 is seated on the lower seat 30 by a shaft 38 which is normally biased to move downwardly by a return spring 36 (described later).

The shaft 38 is axially displaceably disposed in the space 26 in the valve body 18. The shaft 38 comprises a small-diameter shank 38a having a partly spherical abutment surface (not shown) which is normally held in abutment against the ball 32, a large-diameter rod 38b having an end joined to the small-diameter shank 38a through a tapered surface, and a joint rod 38c having an end joined to the large-diameter rod 38b and press-fitted in a stepped hole 42 defined in a movable core 40. The shaft 38 may be made of a nonmagnetic material such as SUS304 (JIS), for example.

A valve seat member 44 is fitted in the inner wall of an intermediate portion of the valve body 18 close to the ball 32, the valve seat member 44 being held against an annular step of the valve body 18. The valve seat member 44 has a through hole 46 defined centrally in the bottom thereof, and the small-diameter shank 38a extends through the through hole 46. The valve seat member 44 also has an upper seat 48 spaced axially from the lower seat 30 for the ball 32 to be seated thereon.

The valve body 18 supports on its outer circumferential surface a plurality of first through third seal members 50a, 50b, 50c spaced predetermined distances in the axial direction of the valve body 18 and mounted in respective annular grooves defined in the outer circumferential surface of the valve body 18.

The solenoid 12 includes the housing 14 having a fixed core 54 with a recess 52 defined therein to a predetermined depth in the axial direction of the shaft 38, the coil 34 housed in the housing 14 and wound around a coil bobbin 56, and the movable core 40 substantially in the form of a hollow cylinder, the movable core 40 having the stepped hole 42 defined axially centrally therethrough.

The movable core 40 has a passage 58 defined perpendicularly to the axial direction thereof and held in fluid communication with the central stepped hole 42. The passage 58 serves to release a fluid under pressure, e.g., oil under pressure, filled in a clearance 60 that is defined between the fixed core 54 and the movable core 40. The coil bobbin 56 is made of a synthetic resin material, for example.

The fixed core 54 and the housing 14 are integrally formed by pressing or the like. Unlike a cylindrical core fixed as a fixed core to the housing 14, the fixed core 54 is made hollow by the recess 52 in the housing 14, and hence is light in weight and can be manufactured inexpensively.

The solenoid 12 also includes the return spring (spring member) 36 having an end engaging an inner end wall surface of the fixed core 54 and the other end engaging a step in the stepped hole 42 in the movable core 40, and a yoke 62 joined to an end of the housing 14 and surrounding an outer circumferential surface of the movable core 40. The movable core 40 is normally pushed by the return spring 36 to move away from the fixed core 54. When the coil 34 of the solenoid 12 is de-energized, the clearance 60 is present between the movable core 40 and the fixed core 54 (see FIG. 1).

The movable core 40, which is substantially in the form of a hollow cylinder, has a nonmagnetic layer 64 (see FIGS. 3 and 4) on its entire outer surface, the nonmagnetic layer 64 having a predetermined depth. The movable core 40 has a larger-diameter portion 66 on its end facing the fixed core 54. The larger-diameter portion 66 has a tapered surface whose diameter is progressively greater than the other portion of the movable core 40 and has a diameter which is substantially the same as the fixed core 54.

Since the movable core 40 has the larger-diameter portion 66 whose diameter is substantially the same as the fixed core 54, the area of the movable core 40 which faces the fixed core 54 is increased for increased magnetic characteristics though the yoke 62 is interposed between the coil bobbin 56 and the movable core 40.

The nonmagnetic layer 64 of the movable core 40 is formed by a surface reforming process such as a carburizing process and/or a nitriding process. The carburizing process and the nitriding process are advantageous in that they prevent the movable core 40 from changing dimensions and make any subsequent processes unnecessary because they can improve the magnetic permeability of the movable core 40 at a relatively low temperature.

The carburizing process may be a solid carburizing process, a liquid carburizing process (carbonitriding process), a gas carburizing process, a plasma carburizing process, or the like. The nitriding process may be a gas nitriding process, a liquid nitriding process (salt bath nitriding process), a soft nitriding process, an ion nitriding process, or the like.

Alternatively, the nonmagnetic layer 64 may be formed on the outer surface of the movable core 40 by a high-frequency induction hardening process, for example. If the nonmagnetic layer 64 is formed by a high-frequency induction hardening process, then the movable core 40 can be heat-treated at a high speed, and hence can be produced in a shortened manufacturing process. The process of forming the nonmagnetic layer 64 on the outer surface of the movable core 40 is not limited to the surface reforming process such as the carburizing process, the nitriding process, or the high-frequency induction hardening process. The nonmagnetic layer 64 may be formed on the outer surface of the movable core 40 by another surface reforming process such as a laser beam applying process.

The movable core 40 may be made of ferritic stainless steel such as SUS410L, SUS405 (JIS), or the like, general steel such as S10C (JIS) or the like, or free-cutting steel such as SUM (JIS) or the like.

Figure 3:
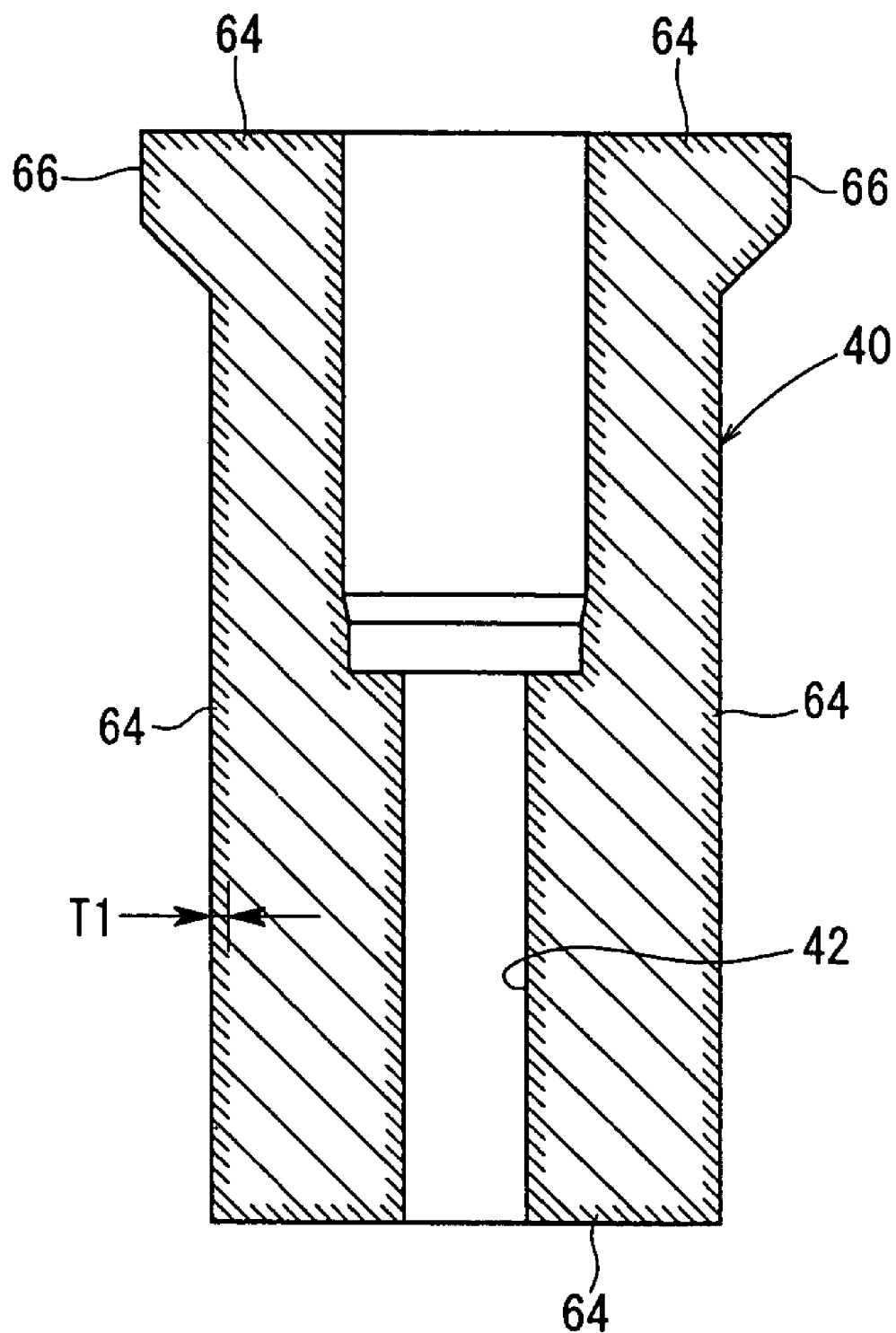
FIG. 3 is an enlarged longitudinal cross-sectional view of a movable core of the electromagnetic valve illustrated in FIG. 1, which includes a thin nonmagnetic layer formed on its entire outer surface.

As shown in FIG. 3, if the nonmagnetic layer 64 formed on the outer surface of the movable core 40 is a thin layer, then the thickness T1 of the nonmagnetic layer 64 may be in the range from 10 μm to 30 μm, or preferably 20 μm. With the thin nonmagnetic layer 64, the magnetic gap produced between the movable core 40 and the yoke 62 can be greatly reduced for increased magnetic forces and hence large attractive force. Therefore, the movable core 40 according to the present embodiment may be smaller in size than a movable core which is cable of producing the same attractive forces.

Figure 4:
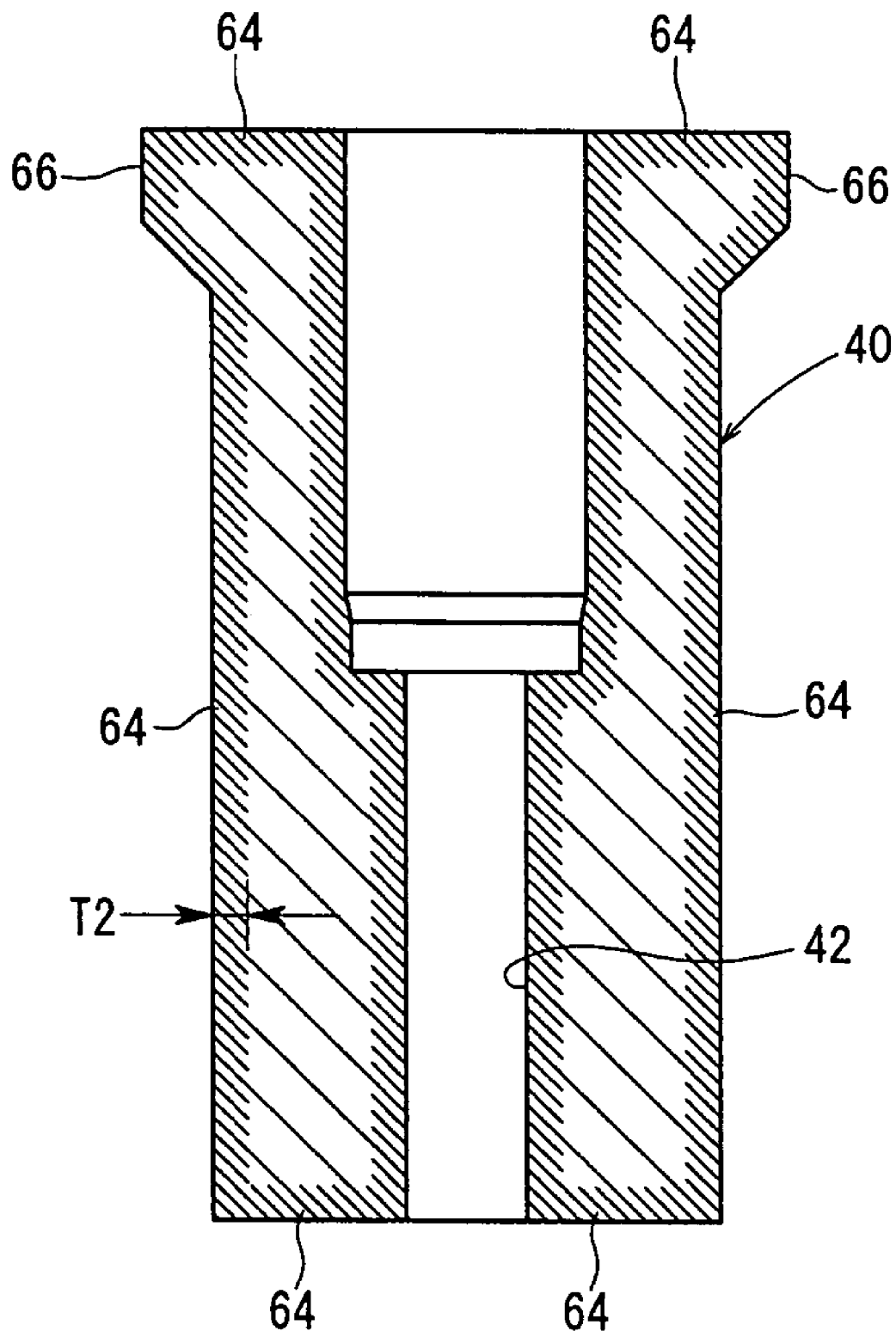
FIG. 4 is an enlarged longitudinal cross-sectional view of a movable core of the electromagnetic valve illustrated in FIG. 1, which includes a thick nonmagnetic layer formed on its entire outer surface.

As shown in FIG. 4, if the nonmagnetic layer 64 formed on the outer surface of the movable core 40 is a thick layer, then the thickness T2 of the nonmagnetic layer 64 may be in the range from 50 μm to 100 μm, or preferably 75 μm. With the thick nonmagnetic layer 64, the magnetic gap produced between the movable core 40 and the yoke 62 can be increased for suppressing side forces acting between the movable core 40 and the yoke 62. If the movable core 40 with the thick nonmagnetic layer 64 is incorporated in a linear solenoid whose hysteresis increases with the side forces, then the linear solenoid has low hysteresis.

The magnetic material, of which the movable core 40 is made, may contain 12 weight % or less of Cr for increased durability.

The yoke 62 comprises a tubular member 68 surrounding an outer circumferential surface of the movable core 40 and extending axially thereof, and an annular flange 70 projecting radially outwardly from an outer circumferential surface of the tubular member 68. The tubular member 68 has a lower end snugly fitted in a socket 72 defined in an inner wall surface of the valve body 18.

Since the yoke 62 is fitted in the socket 72, the yoke 62 can easily and neatly be assembled on the valve body 18 with increased accuracy. The yoke 62 may be integrally made of a magnetic material such as SUM (JIS), for example.

The tubular member 68 is divided into an upper tubular segment 68a extending above the annular flange 70 and a lower tubular segment 68b extending below the annular flange 70. The upper tubular segment 68a has an axial end extending to a position near the larger-diameter portion 66 of the movable core 40 when the solenoid 12 is de-energized. The lower tubular segment 68b has an axial end positioned substantially flush with the lower end of the movable core 40 when the solenoid 12 is energized.

As the length of the zone on which the magnetic gap between the yoke 62 and the movable core 40 acts remains constant irrespective of whether the solenoid 12 is energized or de-energized, attractive forces (electromagnetic forces) are prevented from being affected when the solenoid 12 is energized and de-energized.

The lower tubular segment 68b of the yoke 62 is effective in increasing the area of the magnetic path for increased magnetic characteristics, and makes the axial length of the yoke 62 large for reliably keeping the yoke 62 and the movable core 40 in coaxial alignment.

In the present embodiment, the tubular member 68 of the yoke 62 is illustrated as having both the upper tubular segment 68a and the lower tubular segment 68b. However, the tubular member 68 may have either the upper tubular segment 68a or the lower tubular segment 68b for guiding the movable core 40.

A synthetic resin sealing body 74 which is molded over the outer circumferential surface of the coil 34 and a portion of the coil bobbin 56 is disposed between the housing 14 and the coil 34. The synthetic resin sealing body 74 is molded of a synthetic resin material integrally with a coupler 76 (described later).

O-rings 78a, 78b, 78c having identical triangular cross-sectional shapes are interposed between the synthetic resin sealing body 74 close to the coil bobbin 56 and the housing 14, between an upper surface of the annular flange 70 of the yoke 62 and the synthetic resin sealing body 74, and between a lower surface of the annular flange 70 and the valve body 18.

The synthetic resin sealing body 74 has annular slanted surfaces disposed centrally on respective upper and lower axial ends thereof, and the O-rings 78a, 78b are symmetrically disposed on the respective annular slanted surfaces. Since identically shaped O-rings 78a, 78b, 78c are employed, the cost of the electromagnetic valve 10 is reduced, and there is no possibility of erroneously assembling the O-rings 78a, 78b, 78c.

The lower end of the housing 14 is crimped by a crimping means (not shown) over an upper portion of the valve body 18, so that the housing 14 and the valve body 18 are securely joined together.

The coupler 76 for providing an electric path for energizing the coil 34 is mounted on a side of the housing 14. The coupler 76 has a terminal 77 electrically connected to the coil 34 and having an exposed terminal end 77a that is electrically connected to a power supply (not shown). A substantially L-shaped attachment stay 80 is fixedly mounted on a side of the housing 14 diametrically opposite to the coupler 76.

The electromagnetic valve 10 according to the present embodiment is basically constructed as described above. Operation and advantages of the electromagnetic valve 10 will be described below.

When the coil 34 of the solenoid 12 is de-energized, the ball 32 is seated on the lower seat 30, holding the inlet port 20 out of fluid communication with the outlet port 24 and holding the outlet port 24 in fluid communication with the discharge port 28, as shown in FIG. 1.

Figure 5:
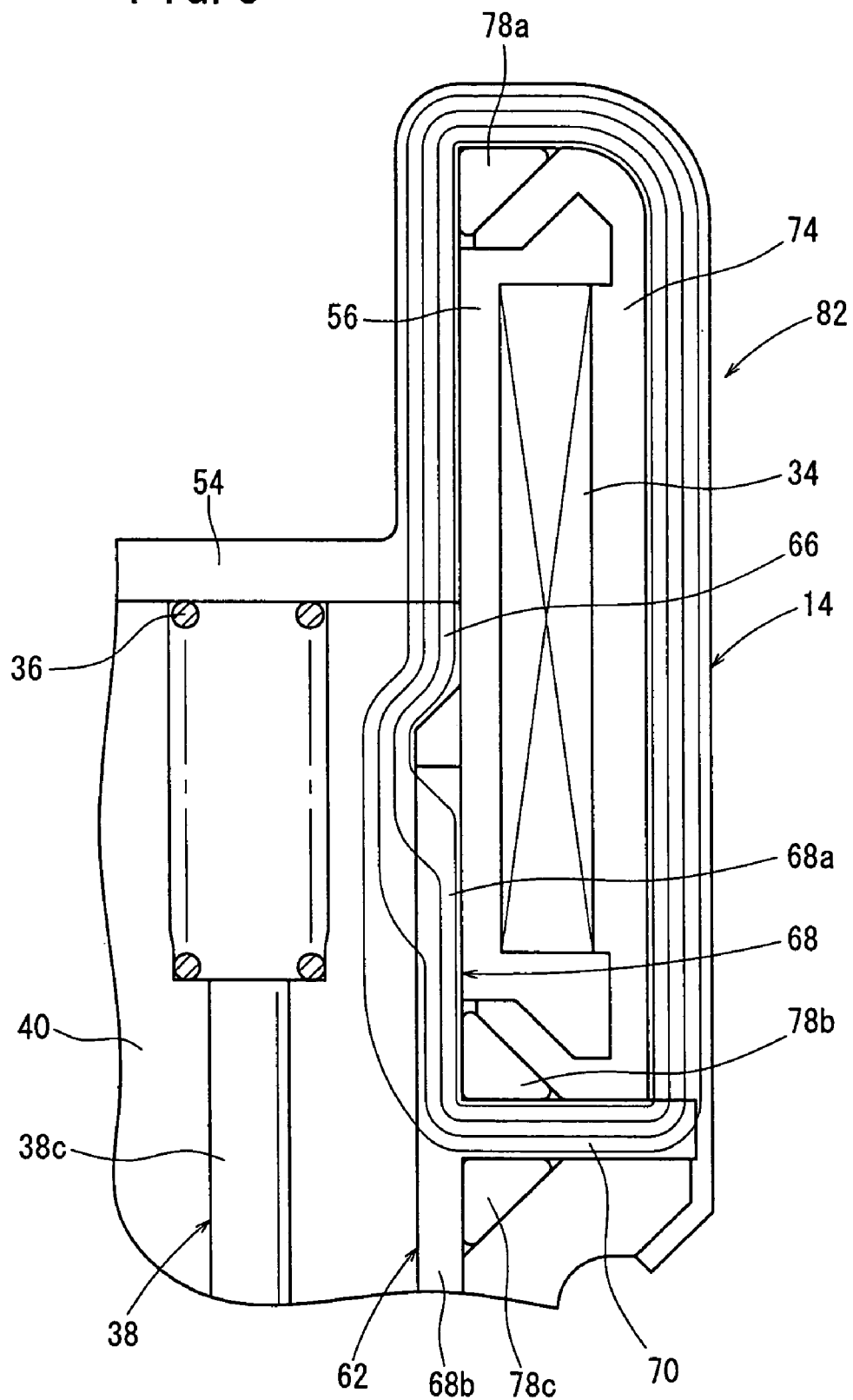
FIG. 5 is an enlarged fragmentary view showing a magnetic circuit of a solenoid.

When the non-illustrated power supply is turned on, the coil 34 of the solenoid 12 is energized, making a magnetic circuit 82 as shown in FIG. 5. The magnetic circuit 82 has magnetic fluxes running from the housing 14 through the yoke 62, the movable core 40, and the fixed core 54 back to the housing 14.

Under electromagnetic forces generated by the magnetic circuit 82, the movable core 40 is attracted to the fixed core 54 against the resiliency of the return spring 36. The shaft 38 integrally coupled to the movable core 40 is displaced upwardly while being guided by the tubular member 68 of the yoke 62, spacing the small-diameter shank 38a of the shaft 38 from the ball 32. The force which pushes the ball 32 downwardly against the lower seat 30 is eliminated, allowing the ball 32 to be unseated off the lower seat 30 and seated on the upper seat 48 under the force of the fluid under pressure (oil under pressure) which is introduced from the inlet port 20.

Figure 2:
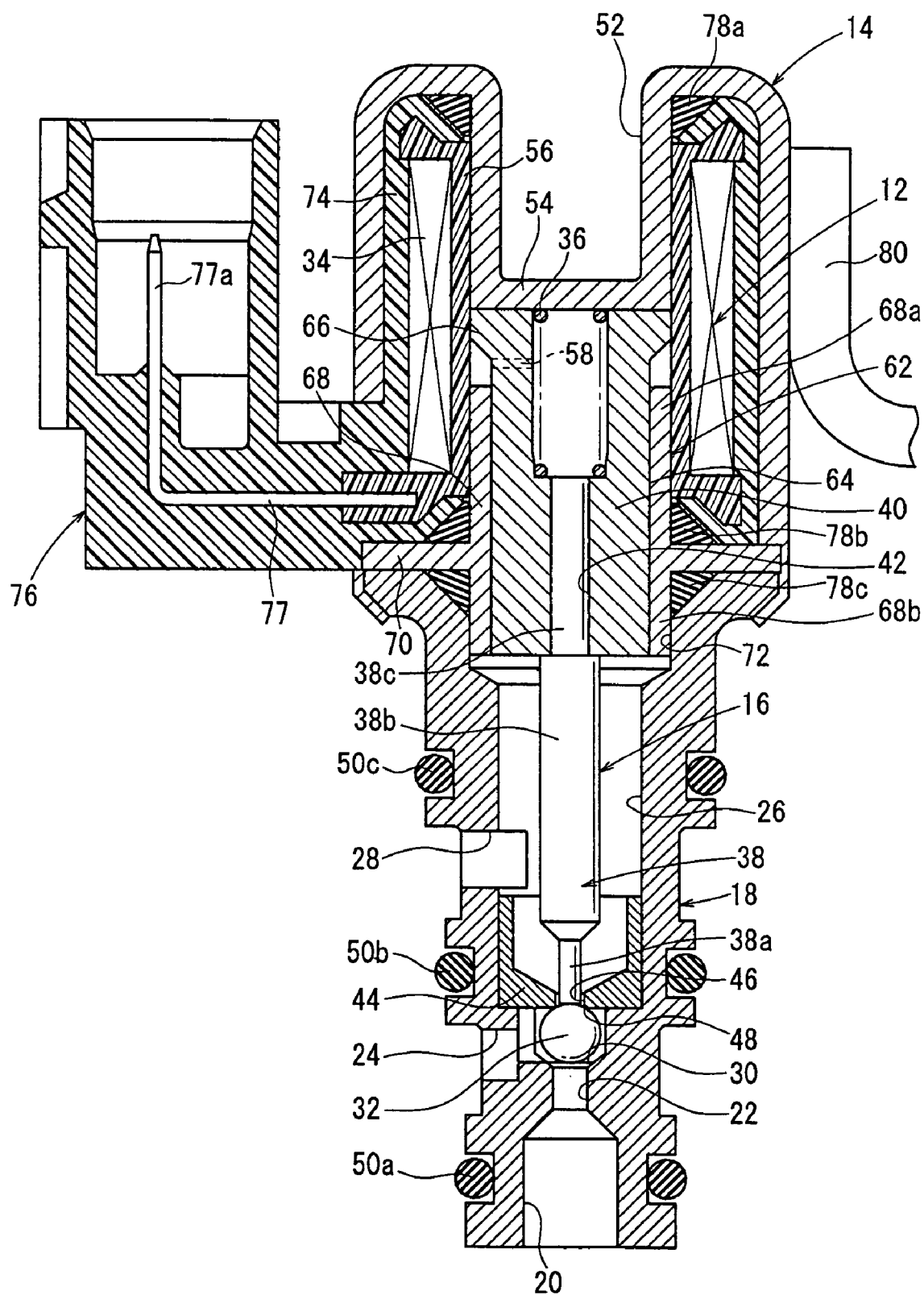
FIG. 2 is a longitudinal cross-sectional view showing the electromagnetic valve illustrated in FIG. 1 which is opened when a solenoid thereof is energized to unseat a ball off a lower seat and seat the ball on an upper seat.

When the ball 32 is unseated off the lower seat 30 and seated on the upper seat 48, the inlet port 20 and the outlet port 24 are brought into fluid communication with each other, i.e., the electromagnetic valve 10 is opened (see FIG. 2). The fluid under pressure introduced from the inlet port 20 flows through the outlet port 24 into an external fluid-controlled device (not shown).

When the power supply is turned off, the coil 34 of the solenoid 12 is de-energized, allowing the movable core 40 and the shaft 38 to be displaced downwardly under the resiliency of the return spring 36. The ball 32 is pressed downwardly and seated on the lower seat 30, i.e., the electromagnetic valve 10 is closed.

In the present embodiment, since the nonmagnetic layer 64 is formed on the entire outer surface of the movable core 40 by the surface reforming process, the nonmagnetic layer 64 functions as a magnetic gap in the magnetic circuit 82 that is made when the coil 34 is energized.

As the nonmagnetic layer 64 is formed on the entire outer surface of the movable core 40, the movable core 40 can easily be formed to desired dimensions by simply managing the outside diameter of the movable core 40. Therefore, a magnetic gap provided by the clearance between the yoke 62 and the movable core 40 can be managed with accuracy for improved magnetic characteristics.

Because of the nonmagnetic layer 64 formed on the entire outer surface of the movable core 40, the movable core 40 is prevented from sticking to the inner wall surface of the yoke 62. In addition, the electromagnetic valve 10 is not required to have a separate nonmagnetic thin film or member, e.g., a nonmagnetic pipe, which would otherwise be used between the movable core 40 and the yoke 62.

Since such a separate nonmagnetic thin film is unnecessary, there is no need to manage the thickness of the nonmagnetic thin film which would otherwise affect the outside diameter of the movable core 40. The nonmagnetic layer 64 is not liable to be peeled off, swell, and cause surface irregularities and pinholes, and therefore the durability and quality of the movable core 40 are improved.

The nonmagnetic layer 64 formed on the entire outer surface of the movable core 40 may be made thin or thick for adjusting the size of the magnetic gap (the clearance between the outer circumferential surface of the movable core 40 and the inner wall surface of the yoke 62). As a result, it is possible to produce desired attractive forces depending on the size of the magnetic gap. If the magnetic gap is minimized insofar as the slidability between the movable core 40 and the yoke 62 is maintained, then the movable core 40 is prevented from being tilted as it is displaced toward the fixed core 54, resulting in stable magnetic characteristics.

In the present embodiment, the yoke 62 has the tubular member 68 extending axially along the outer circumferential surface of the movable core 40 for stably guiding the movable core 40. Inasmuch as the nonmagnetic layer 64 is formed on the entire outer surface of the movable core 40, the movable core 40 is prevented from sticking to the yoke 62 and hence is kept highly slidable against the inner wall surface of the yoke 62. The movable core 40 has good sliding characteristics with respect to the yoke 62 because the sliding surface of the movable core 40 against the yoke 62 is made harder by the nonmagnetic layer 64 than the inner magnetic layer of the movable core 40.

An electromagnetic actuator 110 according to another embodiment of the present invention will be described below with reference to FIGS. 6 through 17.

Figure 6:
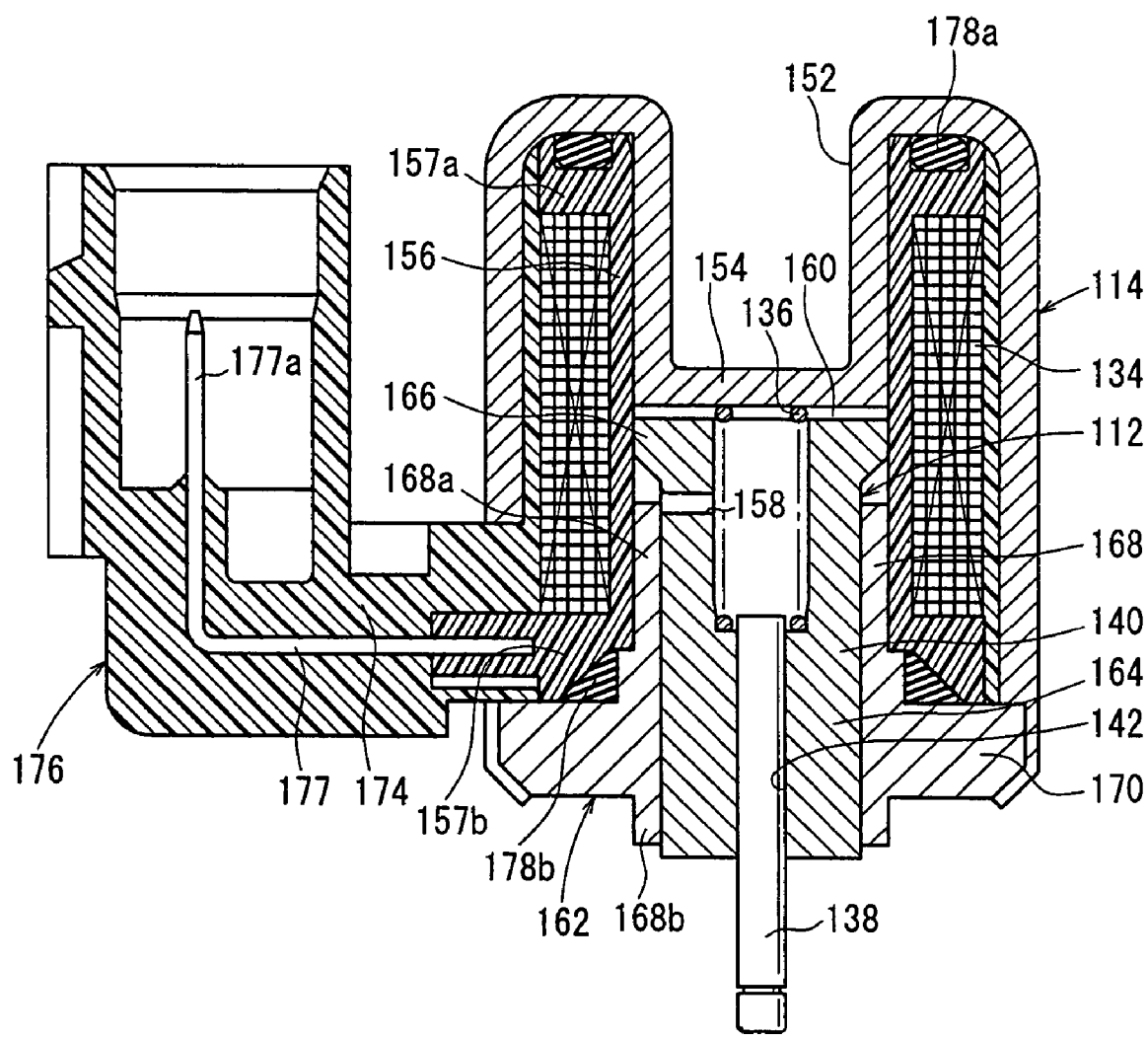
FIG. 6 is a longitudinal cross-sectional view of an electromagnetic actuator according to another embodiment of the present invention, the view being taken along an axial direction of the electromagnetic actuator.
Figure 7:
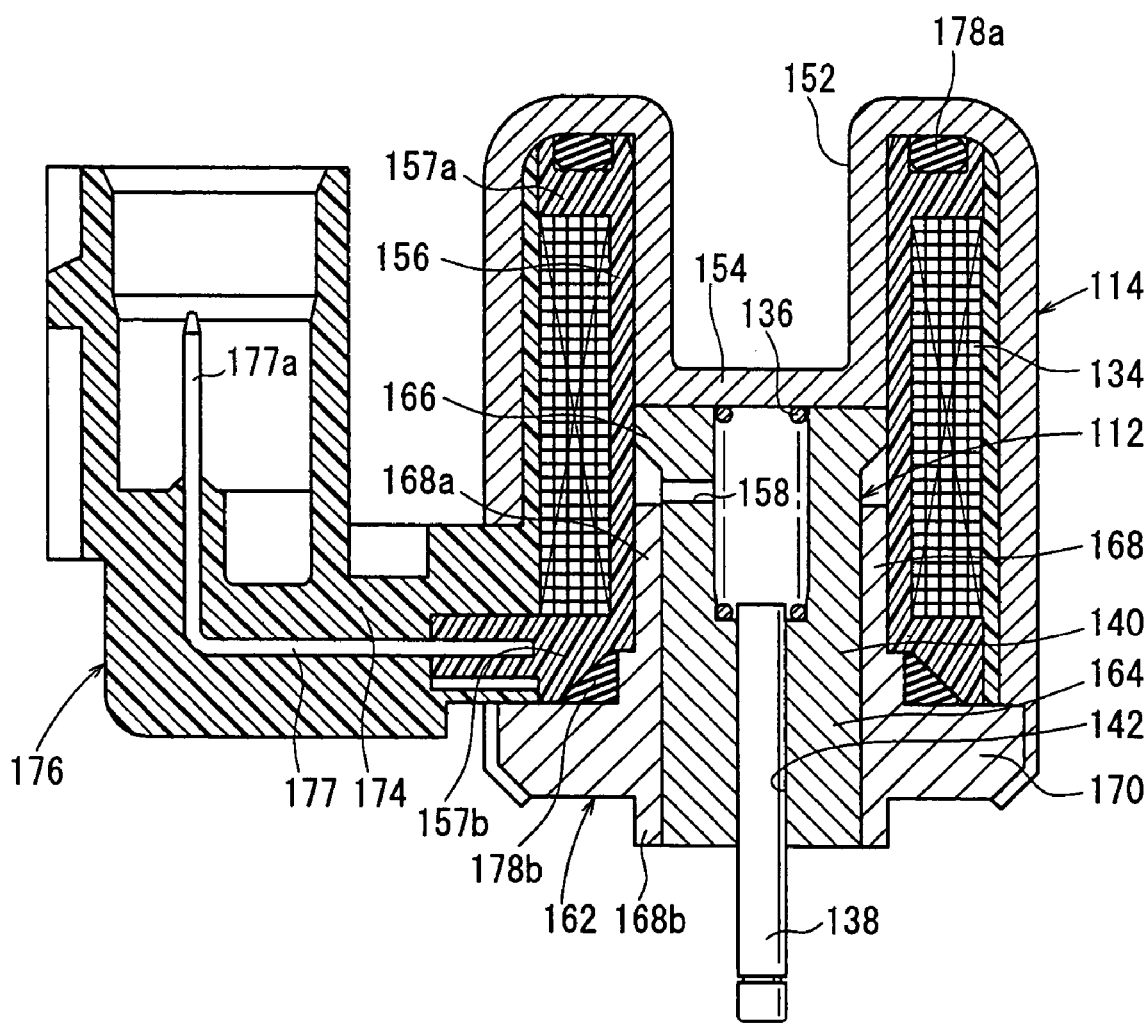
FIG. 7 is a longitudinal cross-sectional view showing the electromagnetic actuator illustrated in FIG. 6 which has a movable core and a shaft lifted when a solenoid thereof is energized.

As shown in FIG. 6, the electromagnetic actuator 110 comprises a housing 114 with a solenoid 112 disposed therein. The housing 114 functions as an actuator body and is made of a magnetic material such as SUM (JIS) or the like.

The solenoid 112 includes a fixed core 154 with a recess 152 defined therein to a predetermined depth from an outer surface of the housing 114, a coil 134 housed in the housing 114 and wound around a coil bobbin 156, a movable core 140 substantially in the form of a hollow cylinder, the movable core 140 having a stepped hole 142 defined axially centrally therethrough, and a shaft (moving member) 138 press-fitted in the stepped hole 142 in the movable core 140 for displacement in unison with the movable core 140. The shaft 138 may be made of a nonmagnetic material such as SUS304 (JIS), for example.

The coil bobbin 156 is made of a synthetic resin material, for example, and has two annular flanges 157a, 157b projecting a predetermined distance radially outwardly from axially spaced ends thereof.

Figure 12:
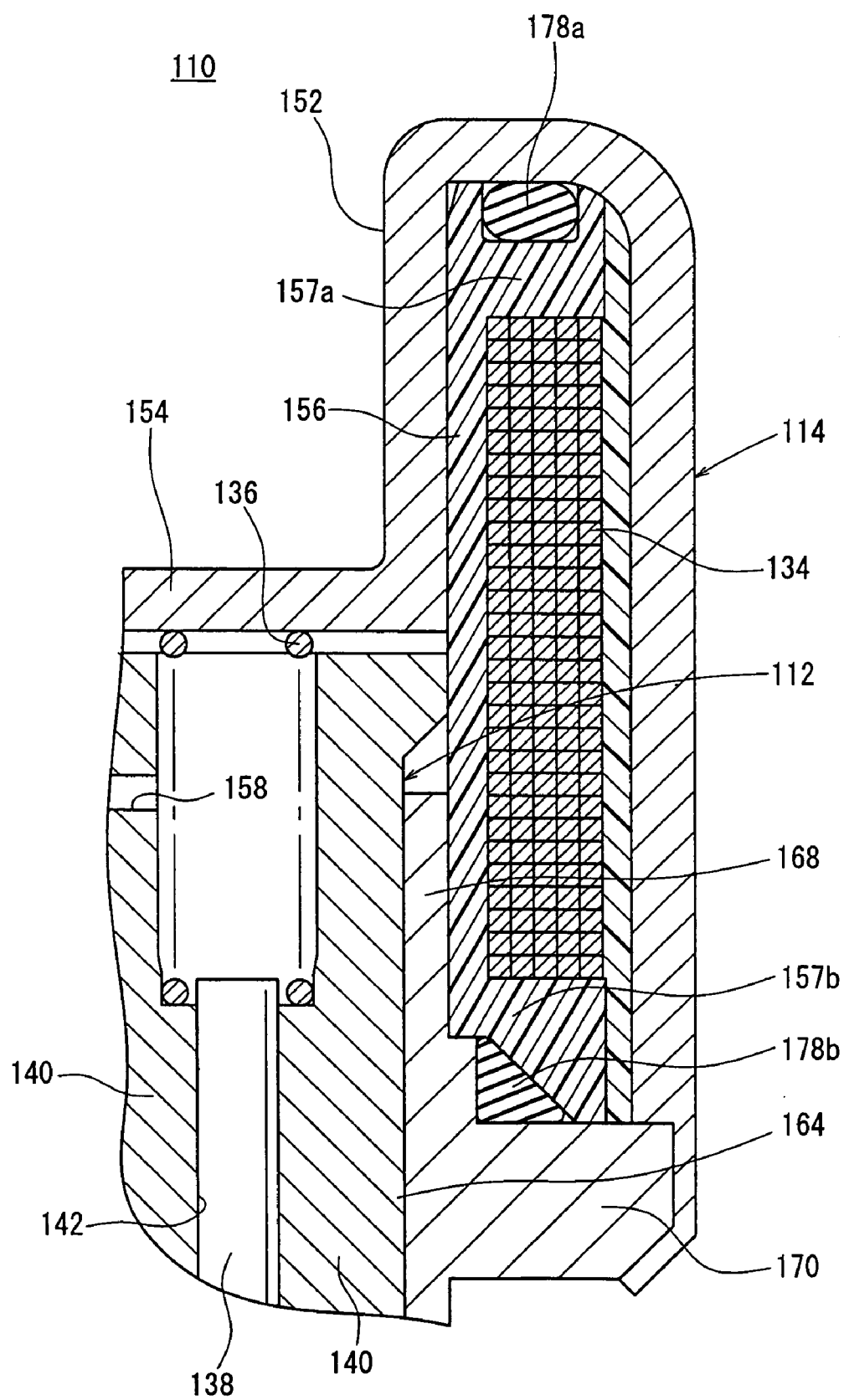
FIG. 12 is an enlarged fragmentary longitudinal cross-sectional view of the electromagnetic actuator illustrated in FIG. 6.
Figure 13:
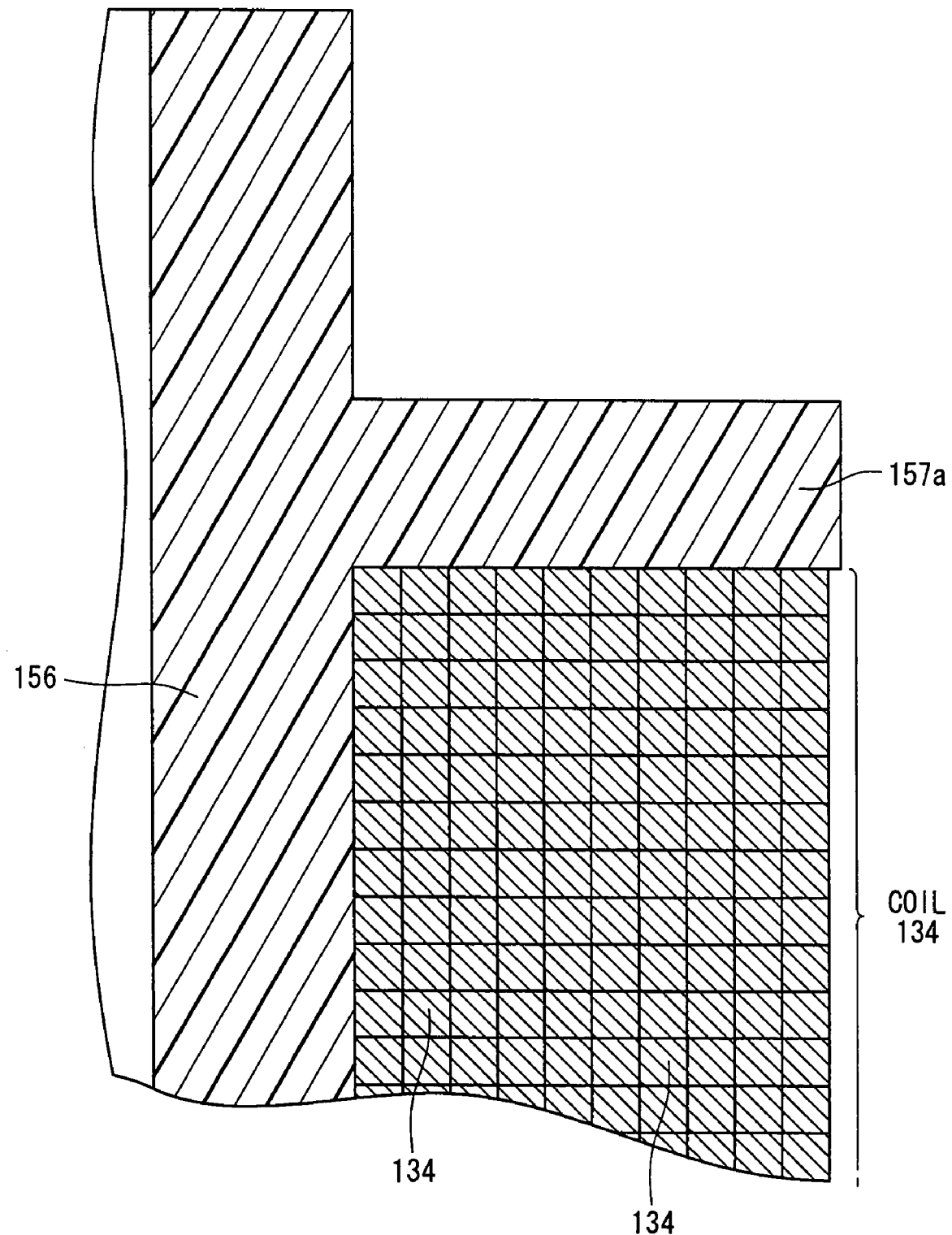
FIG. 13 is an enlarged fragmentary longitudinal cross-sectional view of a coil shown in FIG. 12.
Figure 14:
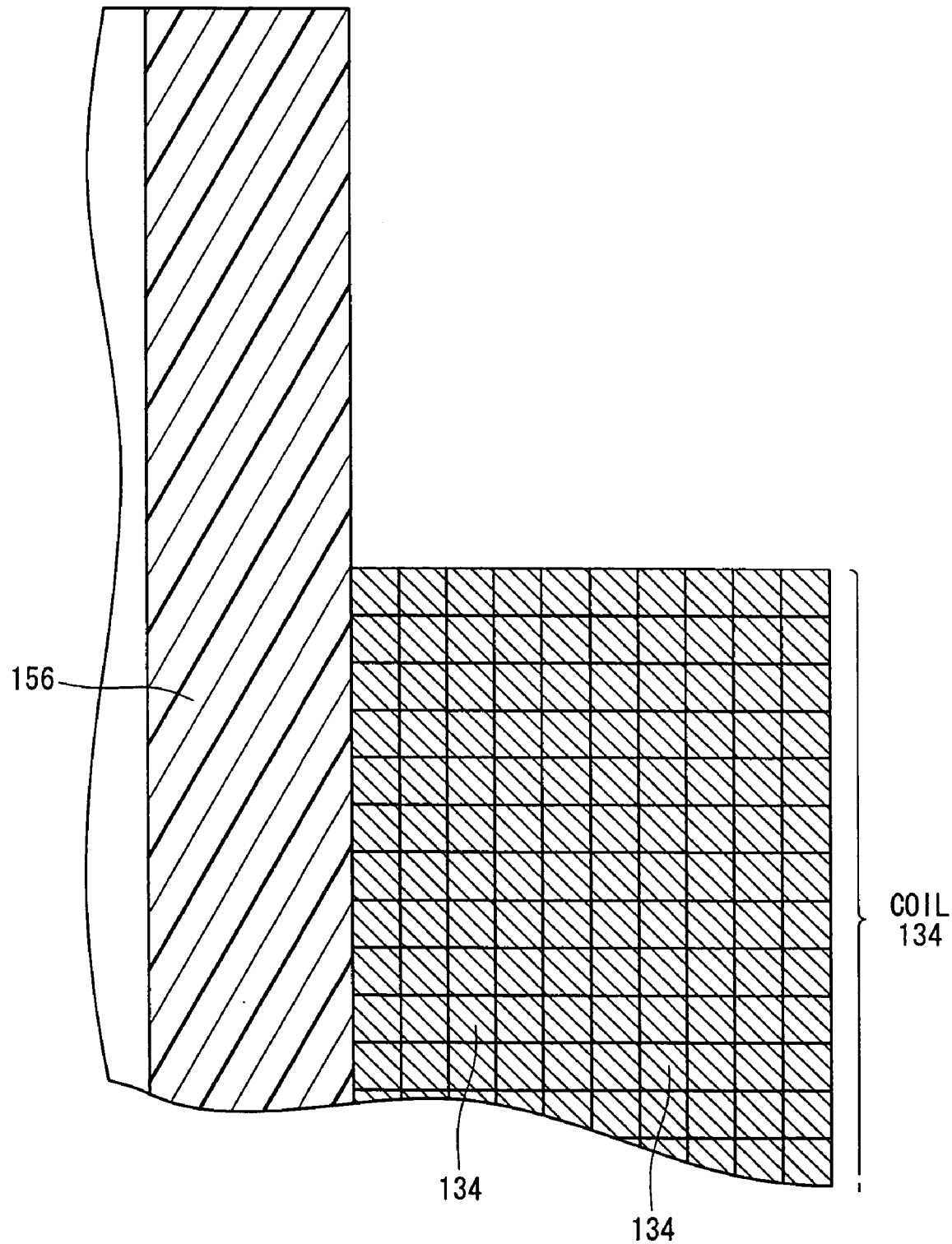
FIG. 14 is an enlarged fragmentary longitudinal cross-sectional view of an electromagnetic actuator with a coil bobbin free of a flange.

As shown in FIGS. 12 and 13, the coil 134 comprises a conductive wire of square cross section. Turns of the coil 134 of square cross section which are wound around the coil bobbin 156 are held in surface-to-surface contact with each other. Therefore, the turns of the coil 134 are stably arrayed in desired positions. Since the turns of the coil 134 are thus stably arrayed, one of the flanges 157a or 157b may be dispensed with as shown in FIG. 14. If one of the flanges 157a or 157b is dispensed with, the axial dimension of the solenoid 112 is reduced to make the solenoid 112 smaller in size.

Figure 26:
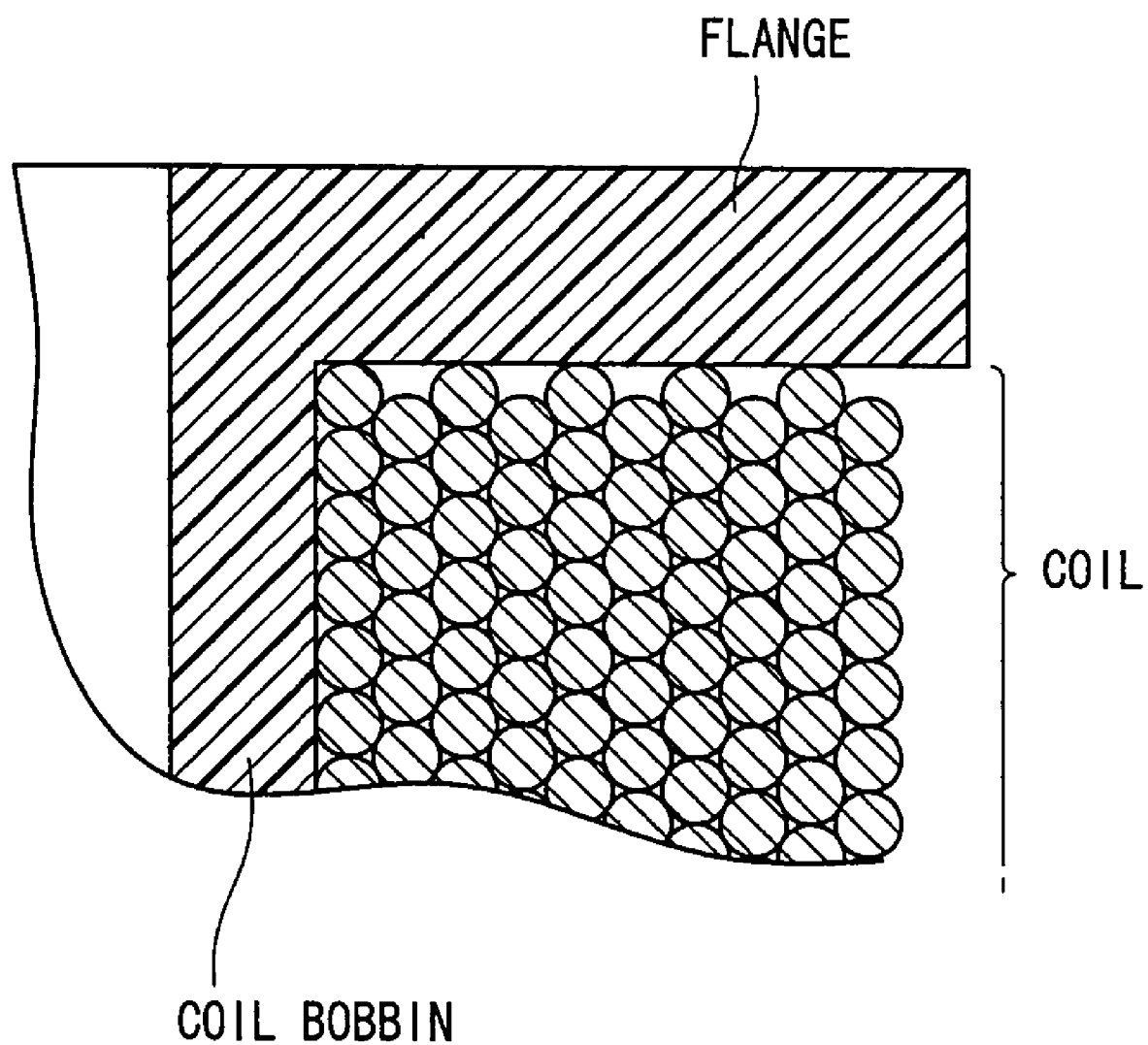
FIG. 26 is an enlarged fragmentary longitudinal cross-sectional view of a conventional coil wound around a coil bobbin.

If a conventional coil comprising a conductive wire of circular cross section is wound around a coil bobbin, as shown in FIG. 26, then the coil is subject to forces causing the coil to slant toward a flange under the tension of the wound coil. The turns of the coil 134 of square cross section according to the present embodiment are held in surface-to-surface contact with each other and are not subject to forces causing the coil 134 to slant toward the flange 157a or 157b. Consequently, one of the flanges 157a or 157b may be dispensed with as shown in FIG. 14.

Figure 15:
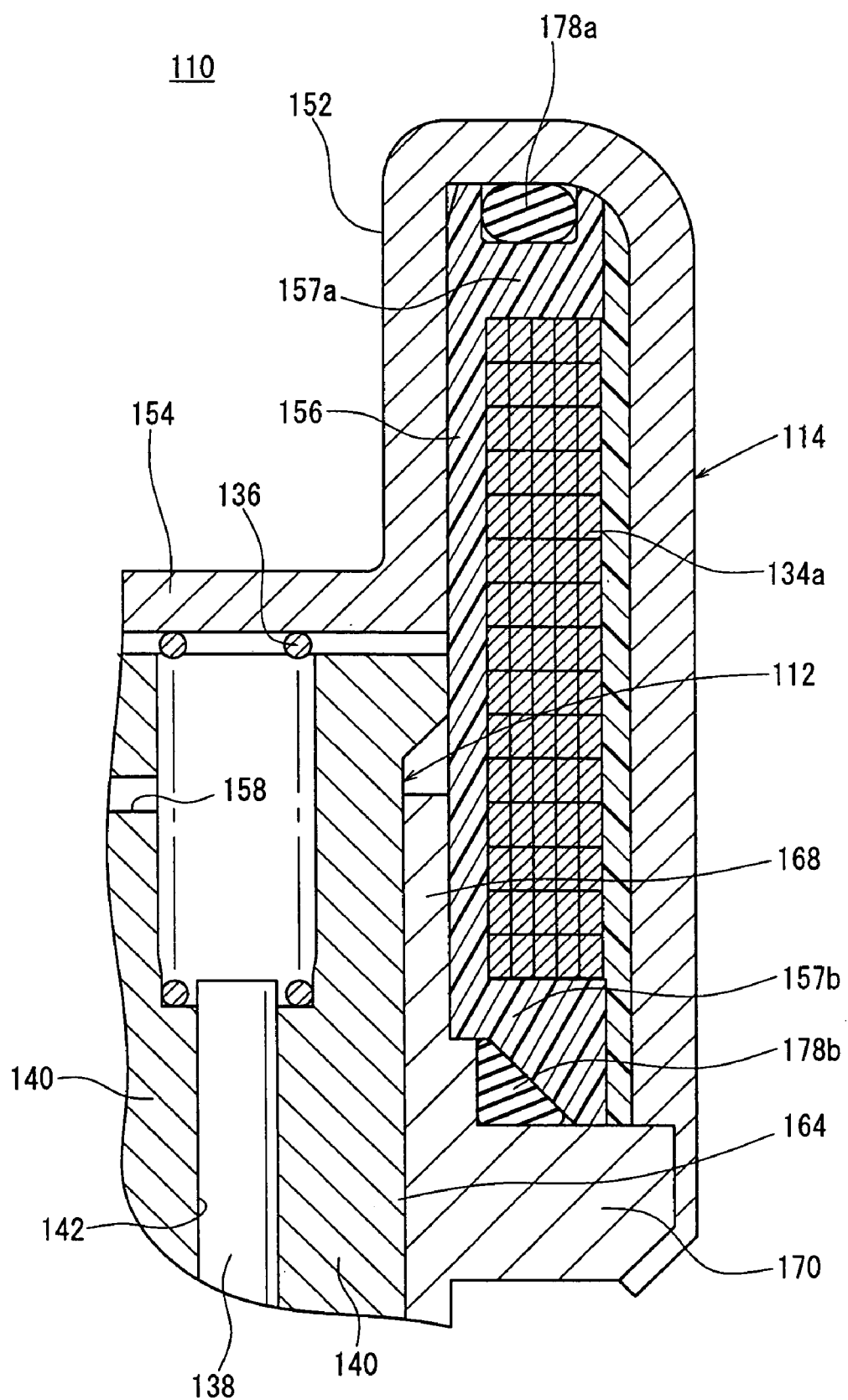
FIG. 15 is an enlarged fragmentary longitudinal cross-sectional view of an electromagnetic actuator including a coil having a wire of elongate rectangular cross section wound around a coil bobbin.
Figure 16:
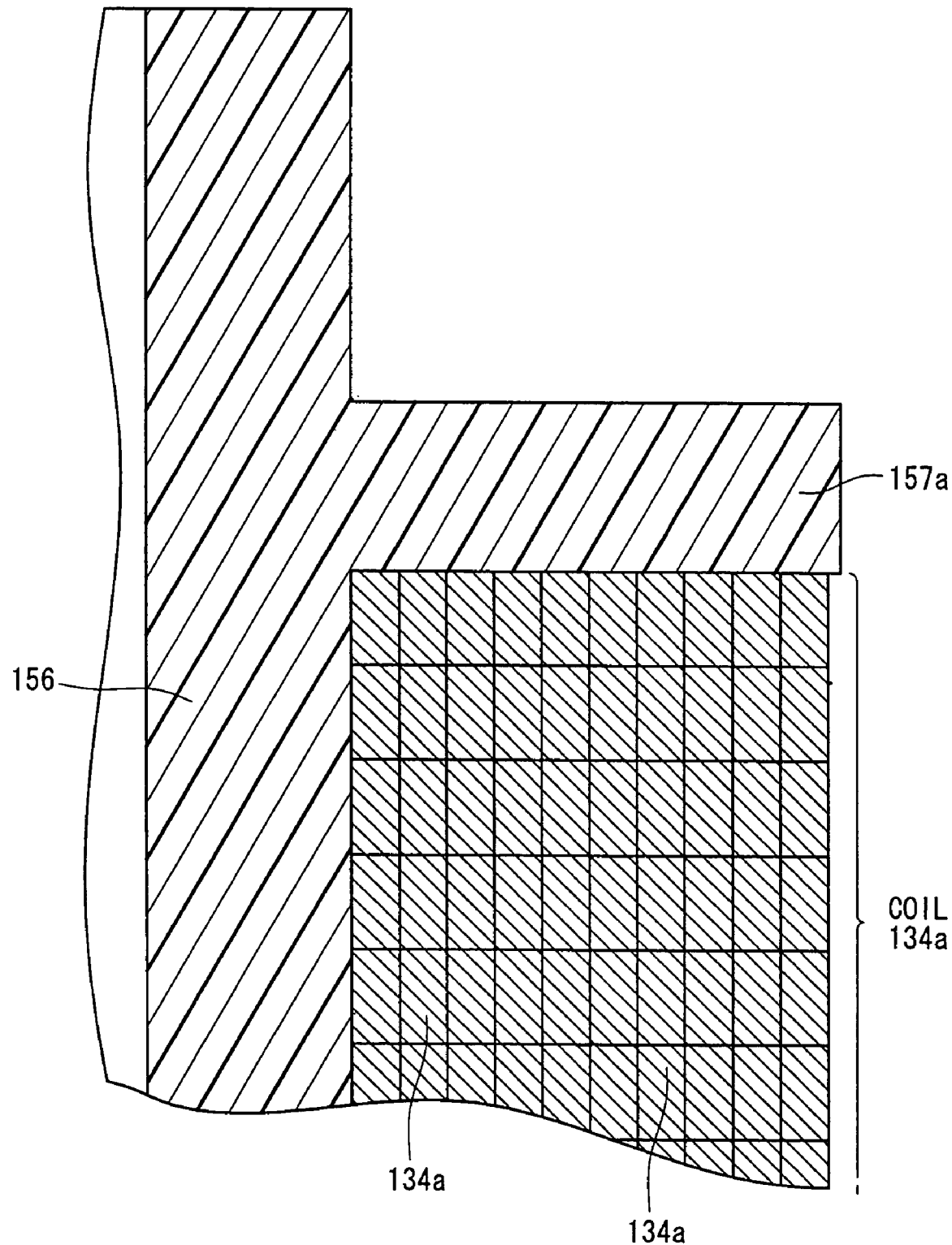
FIG. 16 is an enlarged fragmentary longitudinal cross-sectional view of the coil shown in FIG. 15.

As shown in FIGS. 15 and 16, the solenoid 112 may have a coil 134a comprising a flat conductive wire of elongate rectangular cross section. However, the coil 134 of square cross section can be wound in a smaller space than the coil 134a of elongate rectangular cross section. Furthermore, since the coil 134 of square cross section has a smaller cross-sectional circumferential dimension than the coil 134a of elongate rectangular cross section, the cross-sectional area of an insulating film on the coil 134 may be set to a small value.

The movable core 140 has a passage 158 defined perpendicularly to the axial direction thereof and held in fluid communication with the central stepped hole 142. The passage 158 serves to release a fluid under pressure, e.g., oil under pressure, filled in a clearance 160 that is defined between the fixed core 154 and the movable core 140.

The fixed core 154 and the housing 114 are integrally formed by pressing or the like. Unlike a non-illustrated cylindrical core fixed as a fixed core to the housing 114, the fixed core 154 is made hollow by the recess 152 in the housing 114, and hence is light in weight and can be manufactured inexpensively.

The solenoid 112 also includes a return spring (spring member) 136 having an end engaging an inner end wall surface of the fixed core 154 and the other end engaging a step in the stepped hole 142 in the movable core 140, and a yoke 162 joined to an end of the housing 114 and surrounding an outer circumferential surface of the movable core 140. The movable core 140 is normally pushed by the return spring 136 to move away from the fixed core 154. When the coil 134 of the solenoid 112 is de-energized, the clearance 160 is present between the movable core 140 and the fixed core 154 (see FIG. 6).

The movable core 140, which is substantially in the form of a hollow cylinder, has a nonmagnetic layer 164 (see FIGS. 8 and 9) on its entire outer surface, the nonmagnetic layer 164 having a predetermined depth. The movable core 140 has a larger-diameter portion 166 on its end facing the fixed core 154. The larger-diameter portion 166 has a tapered surface whose diameter is progressively greater than the other portion of the movable core 140 and has a diameter which is substantially the same as the fixed core 154.

Since the movable core 140 has the larger-diameter portion 166 whose diameter is substantially the same as the fixed core 154, the area of the movable core 140 which faces the fixed core 154 is increased for increased magnetic characteristics though the yoke 162 is interposed between the coil bobbin 156 and the movable core 140.

The nonmagnetic layer 164 of the movable core 140 is formed by a surface reforming process such as a carburizing process and/or a nitriding process. The carburizing process and the nitriding process are advantageous in that they prevent the movable core 140 from changing dimensions and make any subsequent processes unnecessary because they can improve the magnetic permeability of the movable core 140 at a relatively low temperature.

The carburizing process may be a solid carburizing process, a liquid carburizing process (carbonitriding process), a gas carburizing process, a plasma carburizing process, or the like. The nitriding process may be a gas nitriding process, a liquid nitriding process (salt bath nitriding process), a soft nitriding process, an ion nitriding process, or the like.

Alternatively, the nonmagnetic layer 164 may be formed on the outer surface of the movable core 140 by a high-frequency induction hardening process, for example. If the nonmagnetic layer 164 is formed by a high-frequency induction hardening process, then the movable core 140 can be heat-treated at a high speed, and hence can be produced in a shortened manufacturing process. The process of forming the nonmagnetic layer 164 on the outer surface of the movable core 140 is not limited to the surface reforming process such as the carburizing process, the nitriding process, or the high-frequency induction hardening process. The nonmagnetic layer 164 may be formed on the outer surface of the movable core 140 by another surface reforming process such as a laser beam applying process.

The movable core 140 may be made of ferritic stainless steel such as SUS410L, SUS405 (JIS), or the like, general steel such as S10C (JIS) or the like, or free-cutting steel such as SUM (JIS) or the like.

Figure 8:
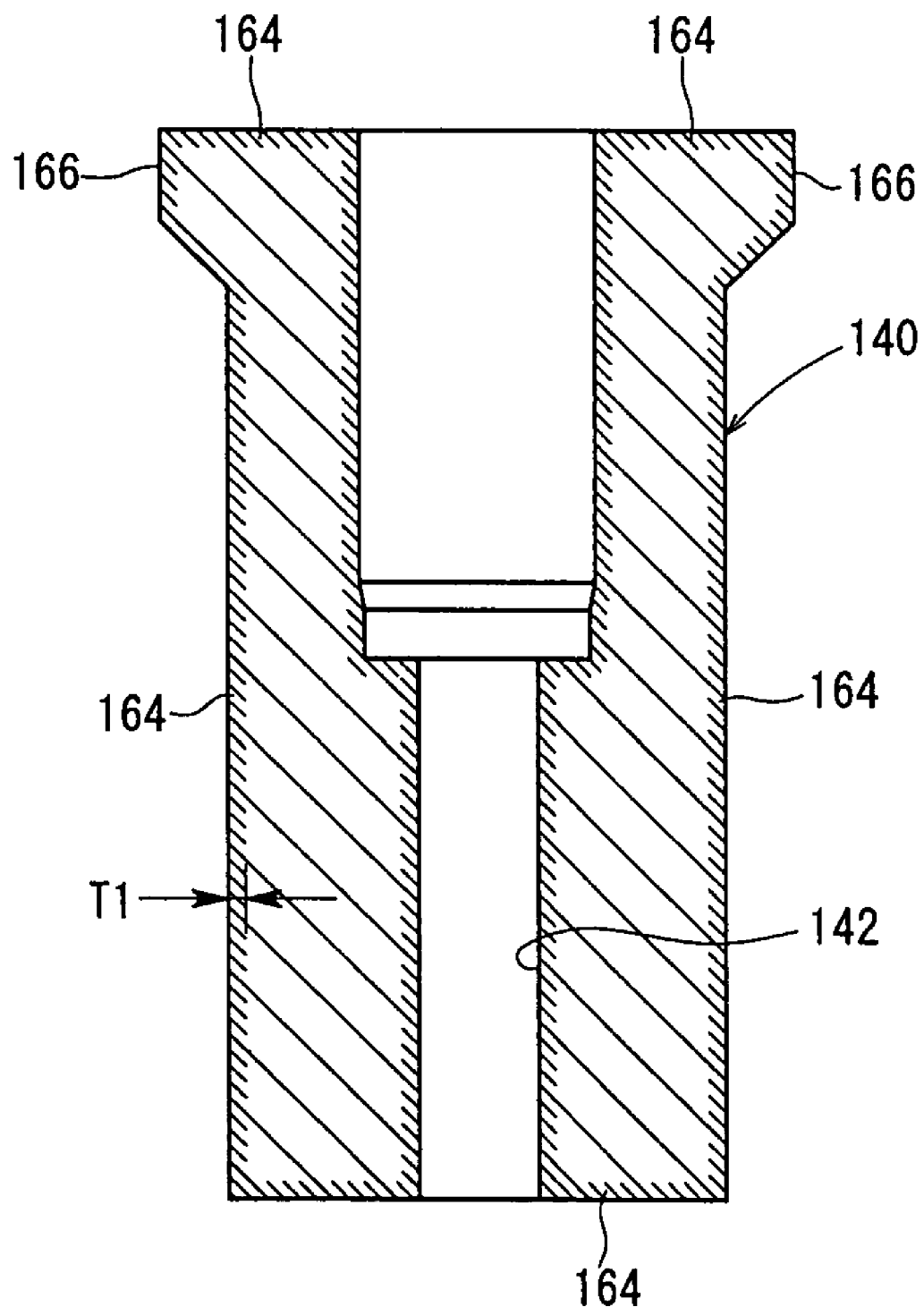
FIG. 8 is an enlarged longitudinal cross-sectional view of a movable core of the electromagnetic actuator illustrated in FIG. 6, which includes a thin nonmagnetic layer formed on its entire outer surface.

As shown in FIG. 8, if the nonmagnetic layer 164 formed on the outer surface of the movable core 140 is a thin layer, then the thickness T1 of the nonmagnetic layer 164 may be in the range from 10 μm to 30 μm, or preferably 20 μm. With the thin nonmagnetic layer 164, the magnetic gap produced between the movable core 140 and the yoke 162 can be greatly reduced for increased magnetic forces and hence large attractive force. Therefore, the movable core 140 in the present embodiment may be smaller in size than a movable core which is cable of producing the same attractive forces.

Figure 9:
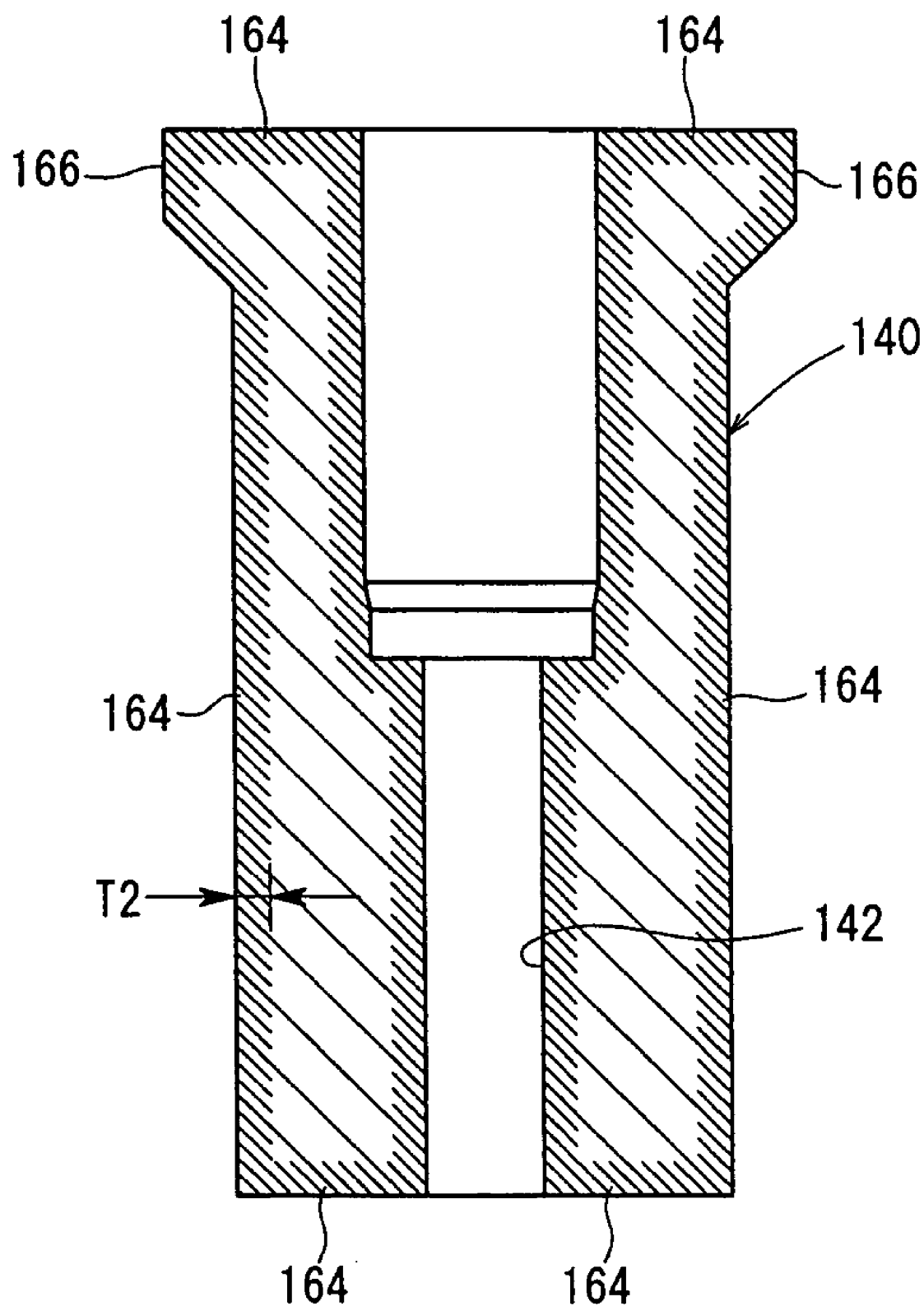
FIG. 9 is an enlarged longitudinal cross-sectional view of a movable core of the electromagnetic actuator illustrated in FIG. 6, which includes a thick nonmagnetic layer formed on its entire outer surface.

As shown in FIG. 9, if the nonmagnetic layer 164 formed on the outer surface of the movable core 140 is a thick layer, then the thickness T2 of the nonmagnetic layer 164 may be in the range from 50 μm to 100 μm, or preferably 75 μm. With the thick nonmagnetic layer 164, the magnetic gap produced between the movable core 140 and the yoke 162 can be increased for suppressing side forces acting between the movable core 140 and the yoke 162. If the movable core 140 with the thick nonmagnetic layer 164 is incorporated in a linear solenoid whose hysteresis increases with the side forces, then the linear solenoid has low hysteresis.

Figure 10:
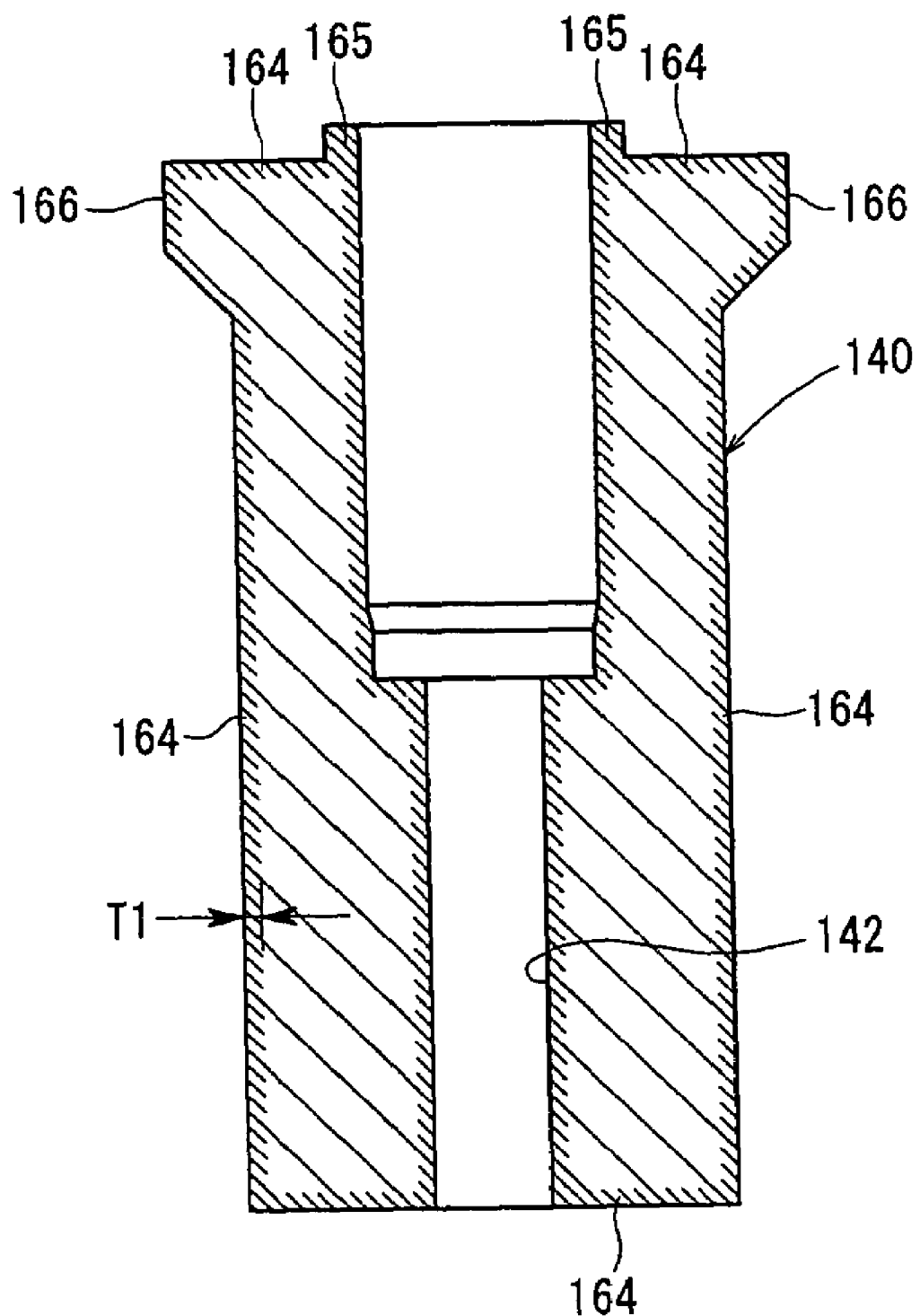
FIG. 10 is an enlarged longitudinal cross-sectional view of a movable core which is similar to the movable core shown in FIG. 8 except an annular ridge formed thereon.
Figure 11:
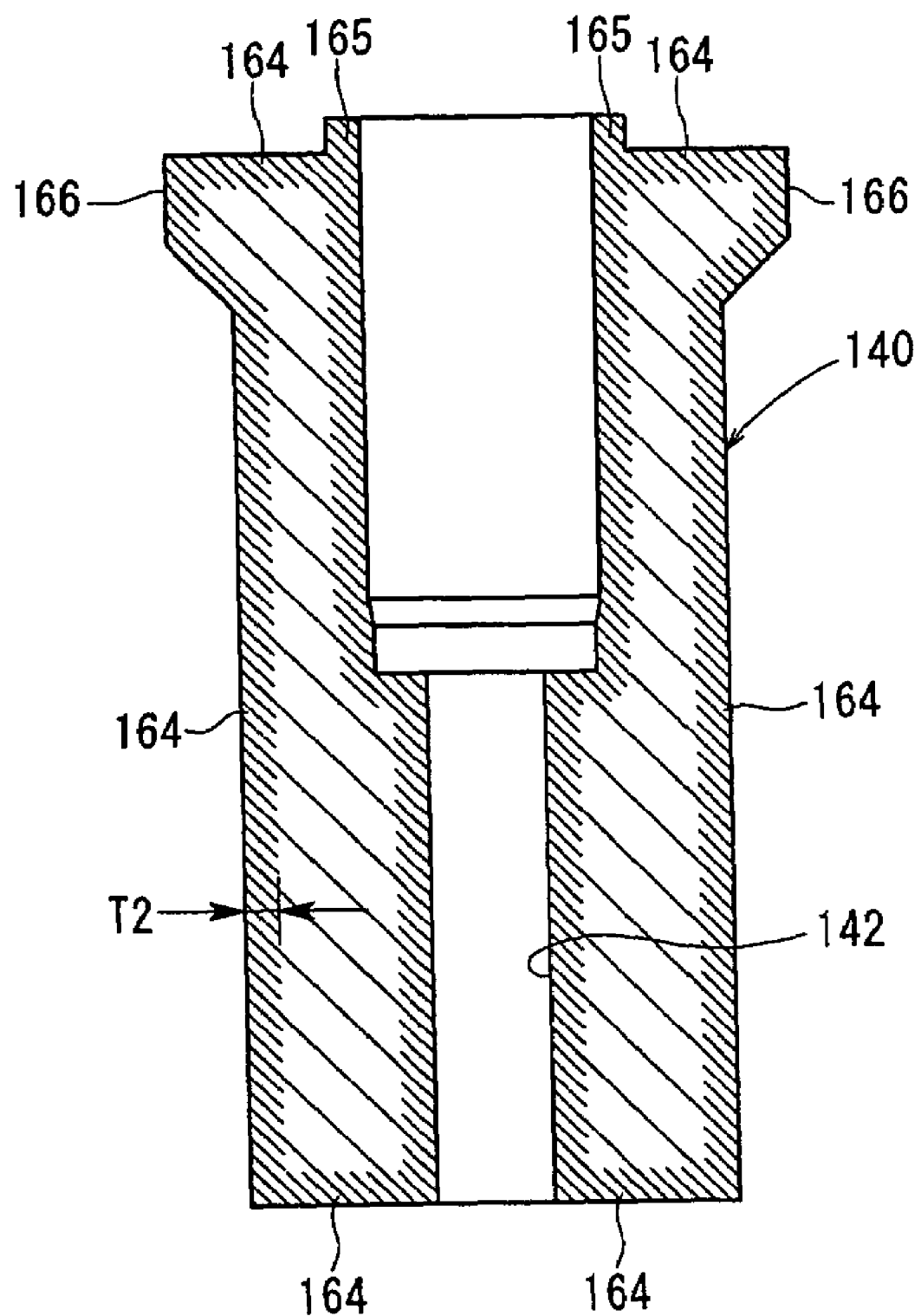
FIG. 11 is an enlarged longitudinal cross-sectional view of a movable core which is similar to the movable core shown in FIG. 9 except an annular ridge formed thereon.

As shown in FIGS. 10 and 11, the movable core 140 may have, on its end face confronting the fixed core 154, an annular ridge 165 formed as part of the thick nonmagnetic layer 164 and functioning as a spacer for preventing residual magnetism from being produced in the solenoid 112.

Specifically, when the solenoid 112 is de-energized, residual magnetism may be produced in the fixed core 154 or the movable core 140, therefore keeping the movable core 140 attracted to the fixed core 154. However, the annular ridge 165 on the end face of the movable core 140 forms a certain clearance between the movable core 140 and the fixed core 154, thereby preventing residual magnetism from being produced.

The magnetic material which the movable core 140 is made of may contain 12 weight % or less of Cr for increased durability.

The yoke 162 comprises a tubular member 168 surrounding the movable core 140 and extending axially thereof, and an annular flange 170 projecting radially outwardly from an outer circumferential surface of the tubular member 168. The yoke 162 may be integrally made of a magnetic material such as SUM (JIS), for example.

The tubular member 168 is divided into an upper tubular segment 168*a* extending above the annular flange 170 and a lower tubular segment 168*b* extending below the annular flange 170. The upper tubular segment 168*a* has an axial end extending to a position near the larger-diameter portion 166 of the movable core 140 when the solenoid 112 is de-energized. The lower tubular segment 168*b* has an axial end positioned substantially flush with the lower end of the movable core 140 when the solenoid 112 is energized.

As the length of the zone on which the magnetic gap between the yoke 162 and the movable core 140 acts remains constant irrespectively of whether the solenoid 112 is energized or de-energized, attractive forces (electromagnetic forces) are prevented from being affected when the solenoid 112 is energized and de-energized.

The lower tubular segment 168*b* of the yoke 162 is effective in increasing the area of the magnetic path for increased magnetic characteristics, and makes the axial length of the yoke 162 large for keeping the yoke 162 and the movable core 140 in coaxial alignment.

In the present embodiment, the tubular member 168 of the yoke 162 is illustrated as having both the upper tubular segment 168*a* and the lower tubular segment 168*b*. However, the tubular member 168 may have either the upper tubular segment 168*a* or the lower tubular segment 168*b* for guiding the movable core 140.

A synthetic resin sealing body 174 which is molded over the outer circumferential surface of the coil 134 and the coil bobbin 156 is disposed between the housing 114 and the coil 134. The synthetic resin sealing body 174 is molded of a synthetic resin material integrally with a coupler 176 (described later).

An O-ring 178*a* of an elliptical cross-sectional shape is mounted in an annular groove defined in the flange 157*a* and interposed between the flange 157*a* and the housing 114.

Another O-ring 178*b* of a triangular cross-sectional shape is interposed between an upper surface of the annular flange 170 of the yoke 162 and the synthetic resin sealing body 174.

The lower end of the housing 114 is crimped by a crimping means (not shown) over the yoke 162, so that the housing 114 and the yoke 162 are securely joined together.

The coupler 176 for providing an electric path for energizing the coil 134 is mounted on a side of the housing 114. The coupler 176 has a terminal 177 electrically connected to the coil 134 and has an exposed terminal end 177*a* that is electrically connected to a power supply (not shown).

The electromagnetic actuator 110 according to the present embodiment is basically constructed as described above. Operation and advantages of the electromagnetic actuator 110 will be described below.

When the coil 134 of the solenoid 112 is de-energized, the movable core 140 is pushed to be spaced a certain distance from the fixed core 154 under the resiliency (pressing force) of the return spring 136, creating the clearance 160 between the end face of the movable core 140 and the fixed core 154.

Figure 17:
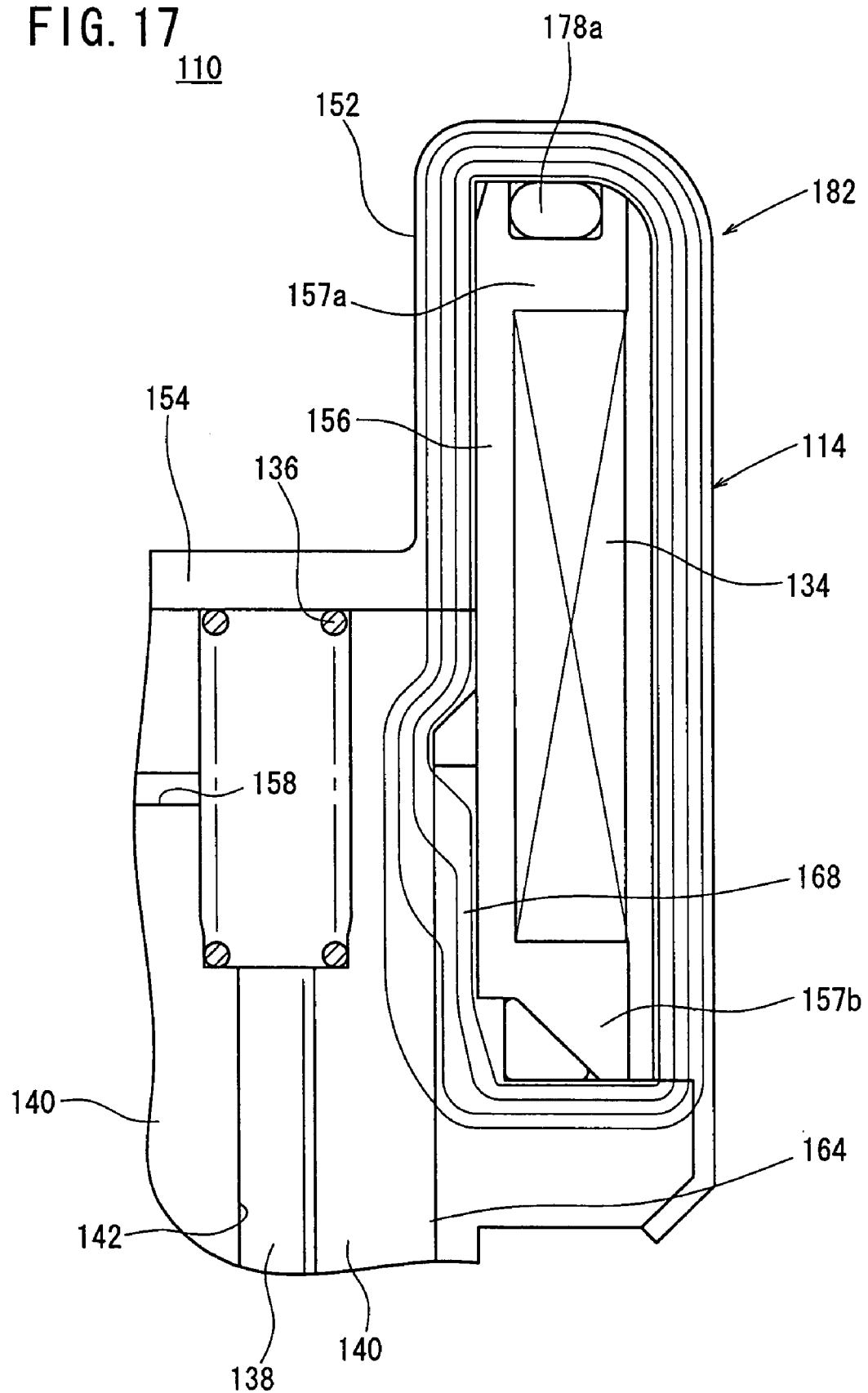
FIG. 17 is an enlarged fragmentary view showing a magnetic circuit of a solenoid.

When the non-illustrated power supply is turned on, the coil 134 of the solenoid 112 is energized, making a magnetic circuit 182 as shown in FIG. 17. The magnetic circuit 182 has magnetic fluxes running from the housing 114 through the yoke 162, the movable core 140, and the fixed core 154 back to the housing 114.

Under electromagnetic forces generated by the magnetic circuit 182, the movable core 140 is attracted to the fixed core 154 against the resiliency of the return spring 136. The shaft 138 integrally coupled to the movable core 140 is displaced upwardly while being guided by the tubular member 168 of the yoke 162.

When the power supply is turned off, the coil 134 of the solenoid 112 is de-energized, allowing the movable core 140 and the shaft 138 to be displaced downwardly under the resiliency of the return spring 136, attaining the initial state wherein the clearance 160 is created between the end face of the movable core 140 and the fixed core 154.

When the solenoid 112 is thus selectively energized or de-energized, the movable core 140 and the shaft 138 are axially moved together in one direction or the other, thereby operating, e.g., pressing or positioning, a workpiece (not shown) engaged by the shaft 138.

In the present embodiment, since the nonmagnetic layer 164 is formed on the entire outer surface of the movable core 140 by the surface reforming process, the nonmagnetic layer 164 functions as a magnetic gap in the magnetic circuit 182 that is made when the coil 134 is energized.

As the nonmagnetic layer 164 is formed on the entire outer surface of the movable core 140, the movable core 140 can easily be formed to desired dimensions by simply managing the outside diameter of the movable core 140. Therefore, a magnetic gap provided by the clearance between the yoke 162 and the movable core 140 can be managed with accuracy for better magnetic characteristics.

Because of the nonmagnetic layer 164 formed on the entire outer surface of the movable core 140, the movable core 140 is prevented from sticking to the inner wall surface of the yoke 162. In addition, the electromagnetic actuator 110 is not required to have a separate nonmagnetic thin film or member as in the conventional technique, e.g., a nonmagnetic pipe, which would otherwise be used between the movable core 140 and the yoke 162.

Since such a separate nonmagnetic thin film is unnecessary, there is no need to manage the thickness of the nonmagnetic thin film which would otherwise affect the outside diameter of the movable core 140. The nonmagnetic layer 164 is not liable to be peeled off, swell, and cause surface irregularities and pinholes; therefore making therefore the durability and quality of the movable core 140 are improved.

The nonmagnetic layer 164 formed on the entire outer surface of the movable core 140 may be made thin or thick for adjusting the size of the magnetic gap (the clearance between the outer circumferential surface of the movable core 140 and the inner wall surface of the yoke 162). As a result, it is possible to produce desired attractive forces depending on the size of the magnetic gap. If the magnetic gap is minimized insofar as the slidability between the movable core 140 and the yoke 162 is maintained, then the movable core 140 is prevented from being tilted as it is displaced toward the fixed core 154, resulting in stable magnetic characteristics.

In the present embodiment, the yoke 162 has the tubular member 168 extending axially along the outer circumferential surface of the movable core 140 for stably guiding the movable core 140. Inasmuch as the nonmagnetic layer 164 is formed on the entire outer surface of the movable core 140, the movable core 140 is prevented from sticking to the yoke 162 and hence is kept highly slidable against the inner wall surface of the yoke 162. The movable core 140 has good sliding characteristics with respect to the yoke 162 because the sliding surface of the movable core 140 against the yoke 162 is made harder by the nonmagnetic layer 164 than the inner magnetic layer of the movable core 140.

In the present embodiment, the coil 134 wound around the coil bobbin 156 of the solenoid 112 is of square cross section, thereby minimizing any gaps between stacked turns of the coil 134. Therefore, the total cross-sectional area of the coil 134, i.e., the overall space occupied by the coil 134 wound around the coil bobbin 156, is smaller than the solenoid coil of circular cross section which has the same number of turns as the coil 134.

Stated otherwise, the ratio of the cross-sectional area of the conductor of the coil 134 to the space in which the coil 134 is wound, i.e., the conductor occupation ratio, may be greater than with the solenoid coil of circular cross section. Since the space in which the coil 134 is wound can be reduced, the coil bobbin 156 can be reduced in size, resulting in a reduction in the overall size of the solenoid 112.

If the space in which the coil 134 is wound is the same as the space in which the solenoid coil of circular cross section is wound, then the number of turns of the coil 134 of square cross section on the coil bobbin 156 is greater than with number of turns of the solenoid coil of circular cross section. Accordingly, the solenoid 112 can produce greater attractive forces (electromagnetic forces) than the solenoid coil of circular cross section.

In the present embodiment, since space in which the coil 134 is wound can be reduced, the total dimension (total length) of the continuous wire of the coil 134 can be reduced, and hence the resistance of the coil 134 can be reduced. As a result, the electric power consumed when the coil 134 is energized can be reduced.

If the coil 134 of square cross section has the same resistance as the solenoid coil of circular cross section, then the number of turns of the coil 134 wound around the coil bobbin 156 is increased in the present embodiment for producing increased attractive forces (electromagnetic forces).

In the present embodiment, since turns of the coil 134 of square cross section are held in surface-to-surface contact with each other, the conductor occupation ratio in the space in which the coil 134 is wound is greater than the conductor occupation ratio in the space in which the coil of circular cross section is wound.

Consequently, any gaps between stacked turns of the coil 134 can be minimized for increasing the density of turns of the coil 134 per unit volume in the space in which the coil 134 is wound. As a result, the heat transfer capability (heat radiation capability) in the space in which the coil 134 is wound is increased. If the electromagnetic actuator is used in an environment where the atmospheric temperature is lower than the temperature to which the coil is heated, then since the heat radiation capability can be increased and the resistance of the coil 134 can be reduced, the amount of heat generated by the coil 134 when it is energized is reduced. Therefore, the resistance of the coil 134 can further be reduced.

FIGS. 18 through 25 show a linear electromagnetic actuator 210 according to still another embodiment of the present invention. Those parts of the linear electromagnetic actuator 210 which are identical to those of the electromagnetic actuator 110 are denoted by identical reference characters, and will not be described in detail below.

The linear electromagnetic actuator 210 includes a housing 214 made of a magnetic material such as SUM (JIS) and comprises a bottomed hollow cylinder, with a solenoid (linear solenoid) 212 disposed therein. The housing 214 functions as an actuator body.

The housing 214 comprises a hollow cylindrical member 215, a yoke 222 disposed in and spaced radially inwardly a predetermined distance from the hollow cylindrical member 215, the yoke 222 extending substantially parallel to the hollow cylindrical member 215, and a bottom 216 which is thicker than the hollow cylindrical member 215 and joining the upper ends of the hollow cylindrical member 215 and the yoke 222. The hollow cylindrical member 215, the yoke 222, and the bottom 216 are formed integrally with each other. The bottom 216 has a recess of substantially U-shaped cross section defined in an inner wall surface thereof providing a thin-walled region 218.

The thin-walled region 218 of the bottom 216, which faces the upper end face of the movable core 226, functions as a magnetic resistance which minimizes magnetic fluxes flowing into the thin-walled region 218.

The solenoid 212 includes a coil assembly 220 housed in the housing 214, and the yoke 222 in the form of a tubular member formed integrally with the housing 214 at the upper closed end of the housing 214, the yoke 222 being disposed in the coil assembly 220.

The solenoid 212 also includes a fixed core 224 held by the housing 214 whose lower open end crimped on the fixed core 224 and spaced a predetermined clearance axially from the yoke 222 within the coil assembly 220, and a movable core 226 slidably fitted in the yoke 222 and the fixed core 224.

Figure 22:
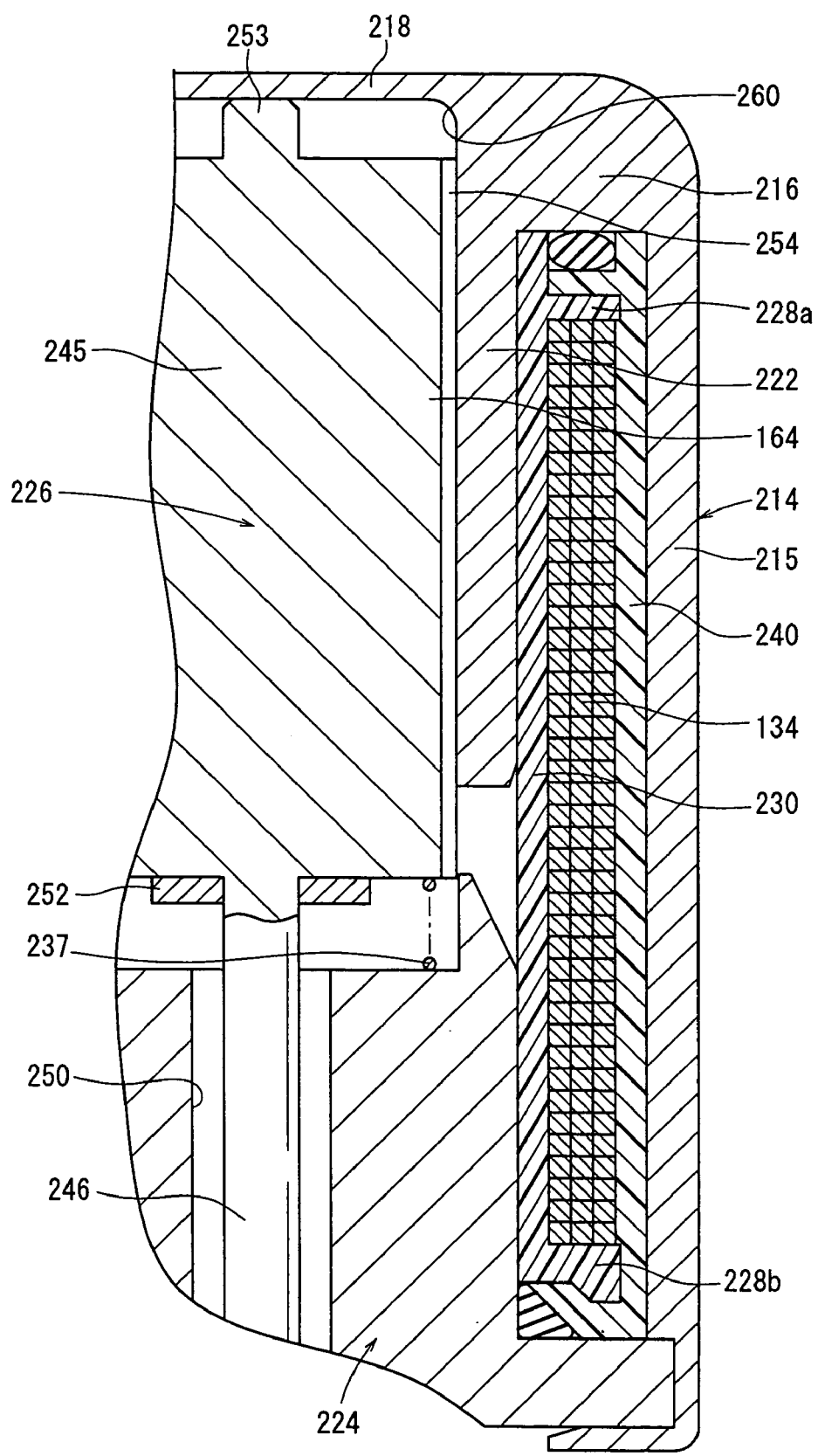
FIG. 22 is an enlarged fragmentary longitudinal cross-sectional view of a linear electromagnetic actuator including a coil having a wire of square cross section wound around a coil bobbin.
Figure 23:
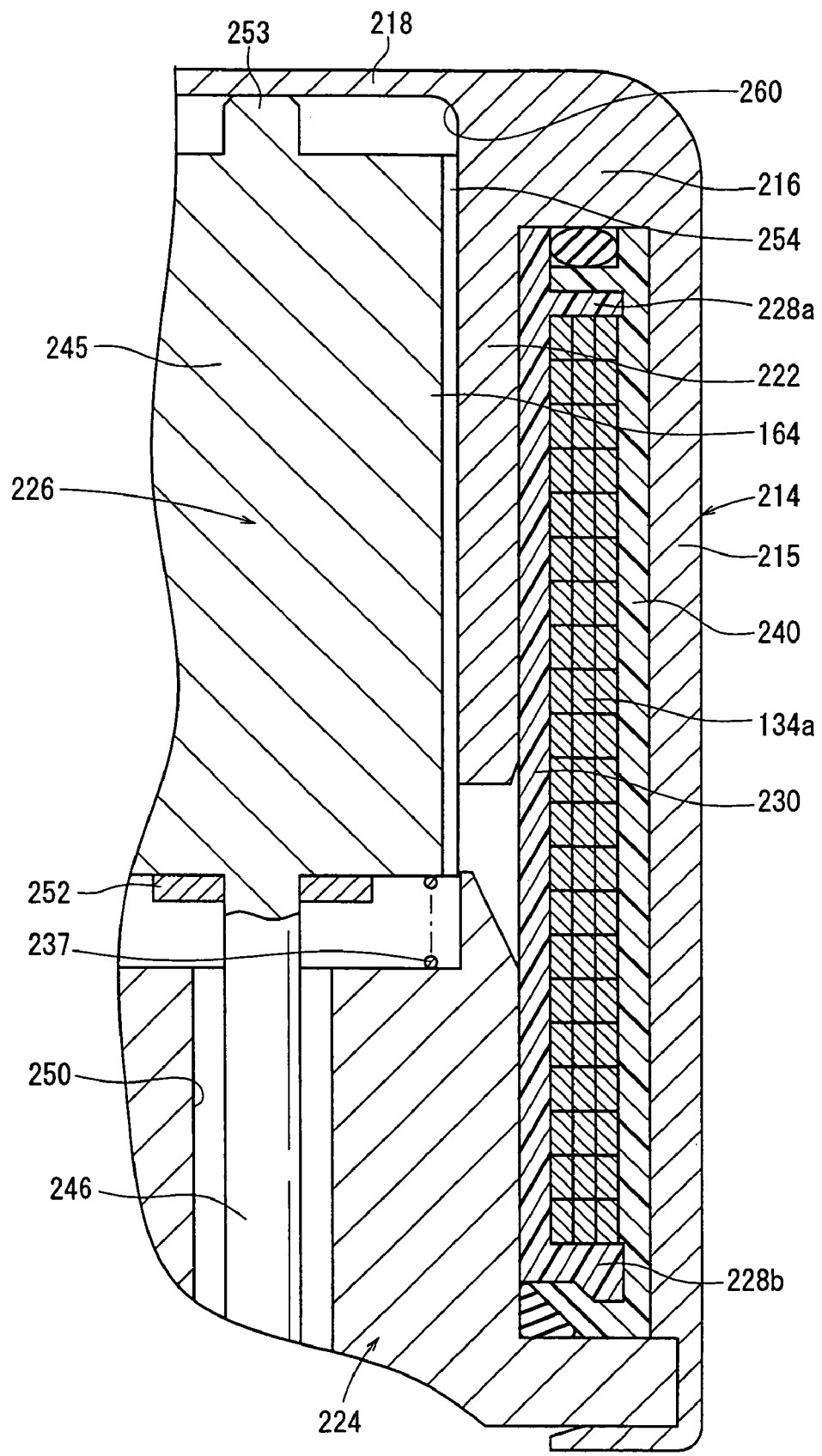
FIG. 23 is an enlarged fragmentary longitudinal cross-sectional view of a linear electromagnetic actuator including a coil having a wire of elongate rectangular cross section wound around a coil bobbin.

The coil assembly 220 comprises a coil bobbin 230 made of a synthetic resin material and having flanges 228a, 228b on axially spaced ends thereof, and a coil 134 having a plurality of turns wound around the coil bobbin 230 and comprising a wire of square cross section as shown in FIG. 22. As shown in FIG. 23, the coil 134 may be a coil 134a comprising a wire of elongate rectangular cross section.

The yoke 222 has an annular flat surface 234 on the lower end thereof which faces the fixed core 224, and the fixed core 224 has an annular conical surface 238 on the upper end thereof which faces the yoke 222, the annular conical surface 238 extending on the outer circumferential surface of the fixed core 224 around a cavity 236 defined in the fixed core 224.

The tubular member as the yoke 222 and the cavity 236 defined in the fixed core 224 are complementary in shape to the movable core 226, providing a linear solenoid structure in which the movable core 226 is slidable between tubular member as the yoke 222 and the cavity 236 defined in the fixed core 224.

A return spring (spring member) 237 is disposed between the fixed core 224 and the movable core 226 and has an end engaging the fixed core 224 and the other end engaging the movable core 226. The fixed core 224 and the movable core 226 are normally biased to move away from each other under the resiliency of the return spring 237. Though the return spring 237 is shown as being a helical spring, it is not limited to a helical spring, but may be another resilient member such as a leaf spring or the like.

The return spring 237 is not limited to being positioned between the fixed core 224 and the movable core 226, but may be positioned on an actuatable member (not shown) engaging a shaft (moving member) 246 (described later) insofar as the return spring 237 can return the movable core 226 to its initial position.

Figure 24:
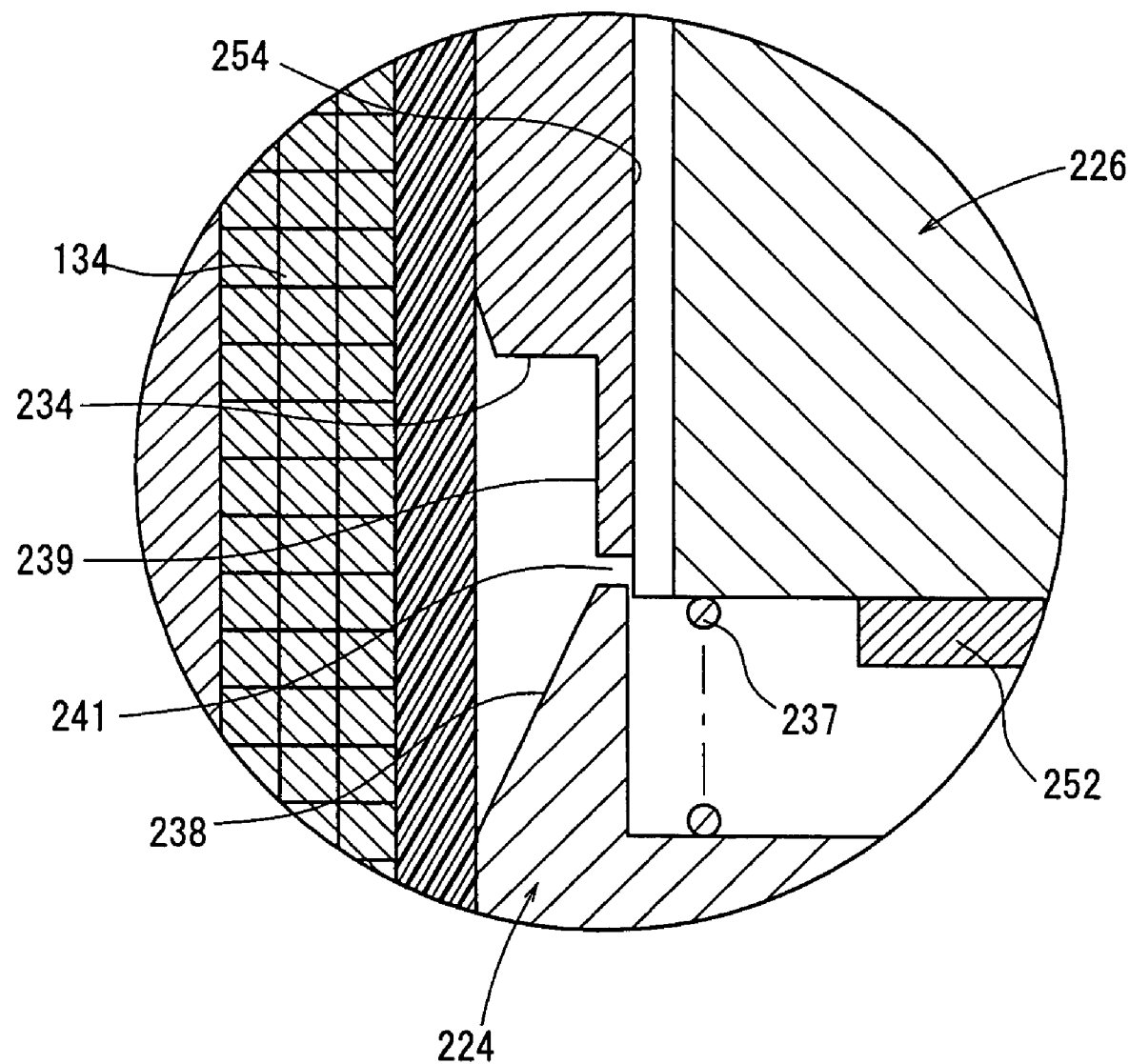
FIG. 24 is an enlarged fragmentary longitudinal cross-sectional view of an encircled portion B shown in FIG. 18.

As shown in FIG. 24, a thin-walled annular guide 239 projecting a predetermined distance toward the conical surface 238 of the fixed core 224 is disposed on the flat surface 234 of the yoke 222 which axially confronts the conical surface 238 of the fixed core 224.

A gap 241 is present as a clearance between the annular guide 239 and the conical surface 238 of the fixed core 224. The thin-walled annular guide 239 on the yoke 222 is effective to guide the movable core 226 stably for better linear movement with respect to the fixed core 224.

A synthetic resin sealing body 240 which is molded over the outer circumferential surface of the coil 134 and a portion of the coil bobbin 230 is disposed between the housing 214 and the coil 134. The synthetic resin sealing body 240 is molded of a synthetic resin material integrally with a coupler 242 which provides an electric path for energizing the coil 134. The coupler 242 has a terminal 244 electrically connected to the coil 134 and has an exposed terminal end 244a.

The coil 134 has its outer circumferential surface covered with the synthetic resin sealing body 240 for being stably protected. If one of the flanges 228a (228b) on the ends of the coil bobbin 230 is dispensed with, then the portion of the coil bobbin 230 which lacks the flange 228a (228b) is also covered with the synthetic resin sealing body 240 for protecting the coil 134 more stably.

The movable core 226 comprises a cylindrical movable core body 245 and a shaft (moving member) 246 disposed centrally on the lower end of the movable core body 245 and extending a predetermined distance coaxially with the movable core body 245. The movable core body 245 and the shaft 246 are formed integrally with each other. The shaft 246 extends axially through a through hole 250 defined centrally in the fixed core 224 and projects out of the through hole 250. The shaft 246 is axially displaceable in and along the through hole 250.

A ring 252 is fitted over the shaft 246 closely to the movable core body 245. The ring 252 is made of a nonmagnetic material and functions as a spacer for preventing residual magnetism from being produced in the solenoid 212.

A protrusion 253 projects integrally axially from the center of the upper end of the movable core body 245. The protrusion 253 functions as a stopper for abutment against the thin-walled region 218 of the bottom 216 of the housing 214. The protrusion 253 is formed as part of the nonmagnetic layer 164, and functions as a spacer for preventing residual magnetism from being produced in the solenoid 212. The movable core body 245 has axial communication grooves 254 defined in its outer circumferential surface and providing communication between the opposite ends of the movable core body 245.

Figure 20:
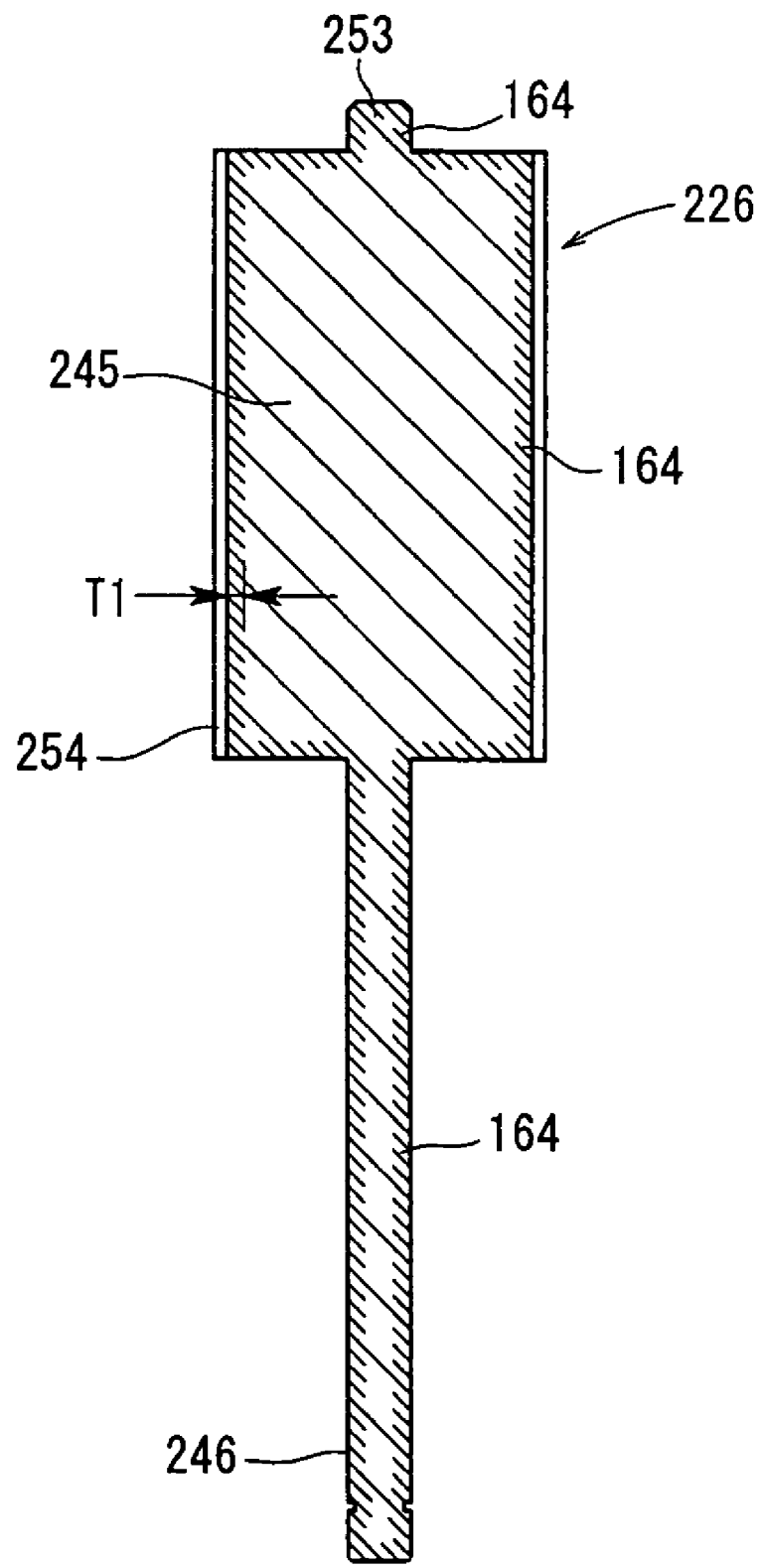
FIG. 20 is an enlarged longitudinal cross-sectional view of a movable core of the linear electromagnetic actuator illustrated in FIG. 18, which includes a thin nonmagnetic layer formed on its entire outer surface.
Figure 21:
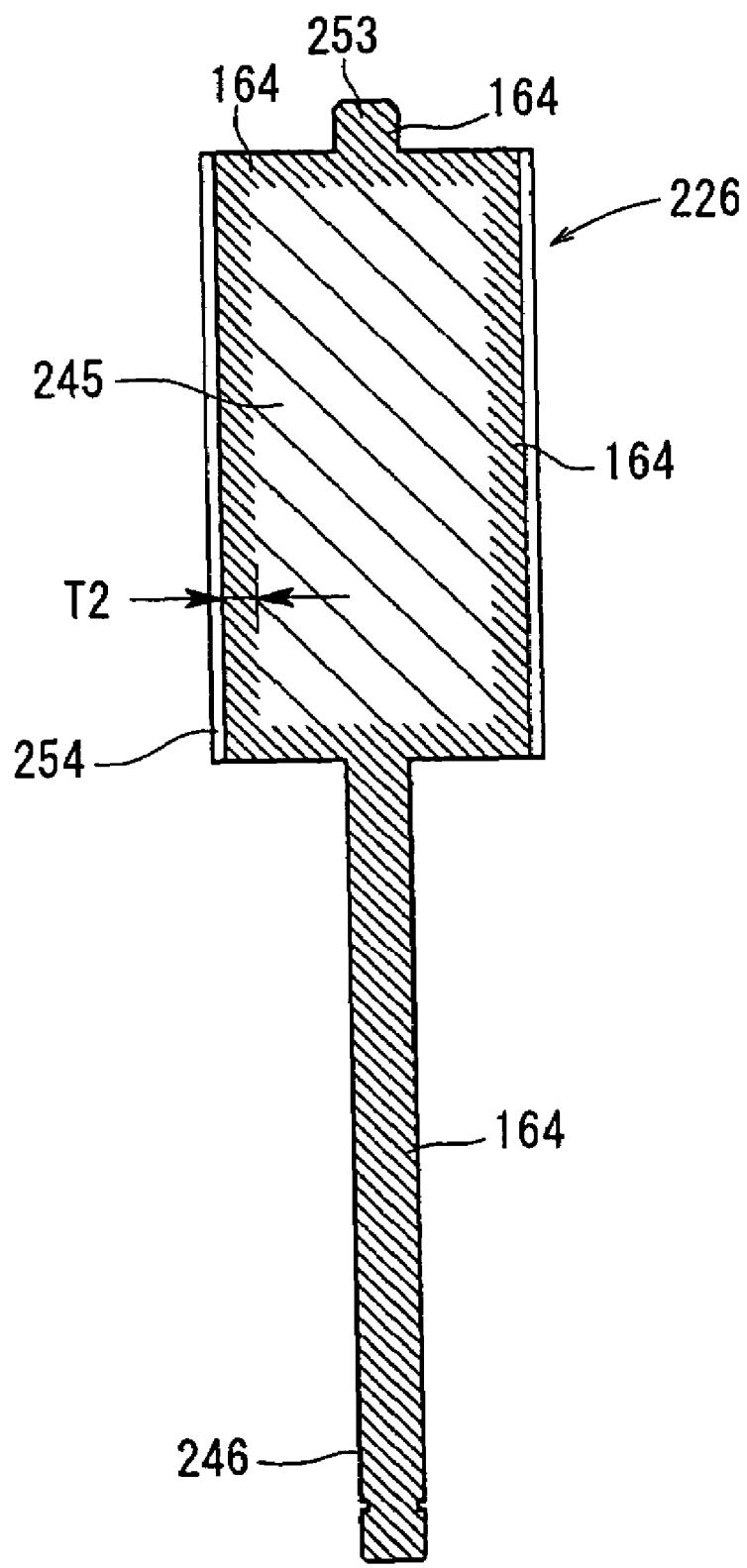
FIG. 21 is an enlarged longitudinal cross-sectional view of a movable core of the linear electromagnetic actuator illustrated in FIG. 18, which includes a thick nonmagnetic layer formed on its entire outer surface.

The movable core 226 has the nonmagnetic layer 164 on its entire outer surface, the nonmagnetic layer 164 having a predetermined depth (see FIGS. 20 and 21).

As shown in FIG. 20, if the nonmagnetic layer 164 formed on the outer surface of the movable core 226 is a thin layer, then the thickness T1 of the nonmagnetic layer 164 may be in the range from 10 µm to 30 µm, or preferably 20 µm. As shown in FIG. 21, if the nonmagnetic layer 164 formed on the outer surface of the movable core 226 is a thick layer, then the thickness T2 of the nonmagnetic layer 164 may be in the range from 50 µm to 100 µm, or preferably 75 µm.

As shown in FIGS. 20 and 21, the shaft 246 and the protrusion 253 are formed integrally with the movable core body 245. However, a shaft (not shown) separate from the movable core body 245 may be fitted in a through hole (not shown) defined axially in the movable core body 245, and the shaft may have an end projecting a predetermined distance from an end face of the movable core body 245, providing the shaft 246, with the other end of the shaft projecting a predetermined distance from the other end face of the movable core body 245, providing the protrusion 253.

The linear electromagnetic actuator 210 according to the present embodiment is basically constructed as described above. Operation and advantages of the linear electromagnetic actuator 210 will be described below.

Figure 18:
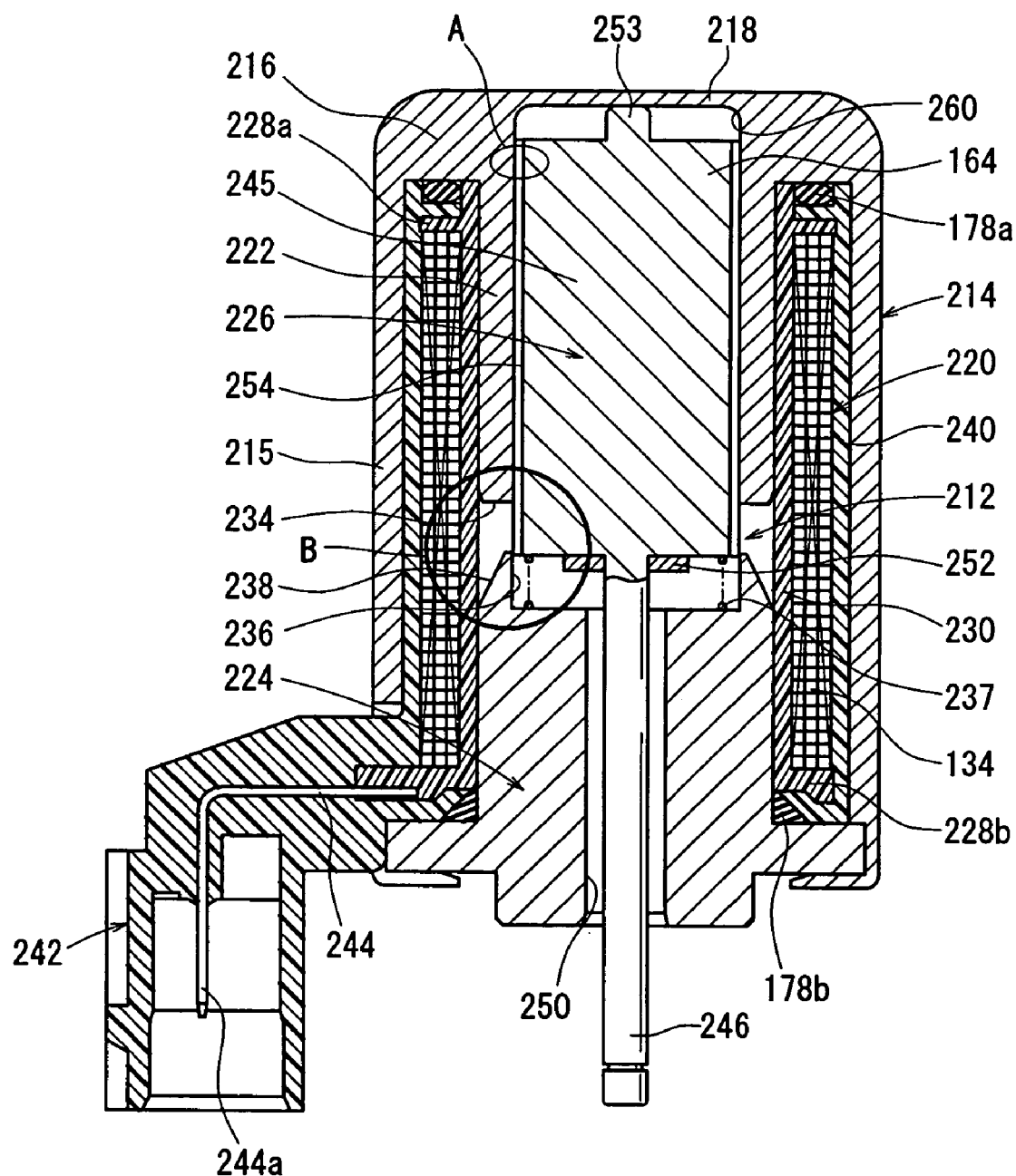
FIG. 18 is a longitudinal cross-sectional view of a linear electromagnetic actuator according to still another embodiment of the present invention, the view being taken along an axial direction of the linear electromagnetic actuator.

When the solenoid 212 is de-energized, the fixed core 224 and the movable core 226 are spaced a predetermined distance from each other under the resiliency (pressing force) of the return spring 237, as shown in FIG. 18.

Figure 25:
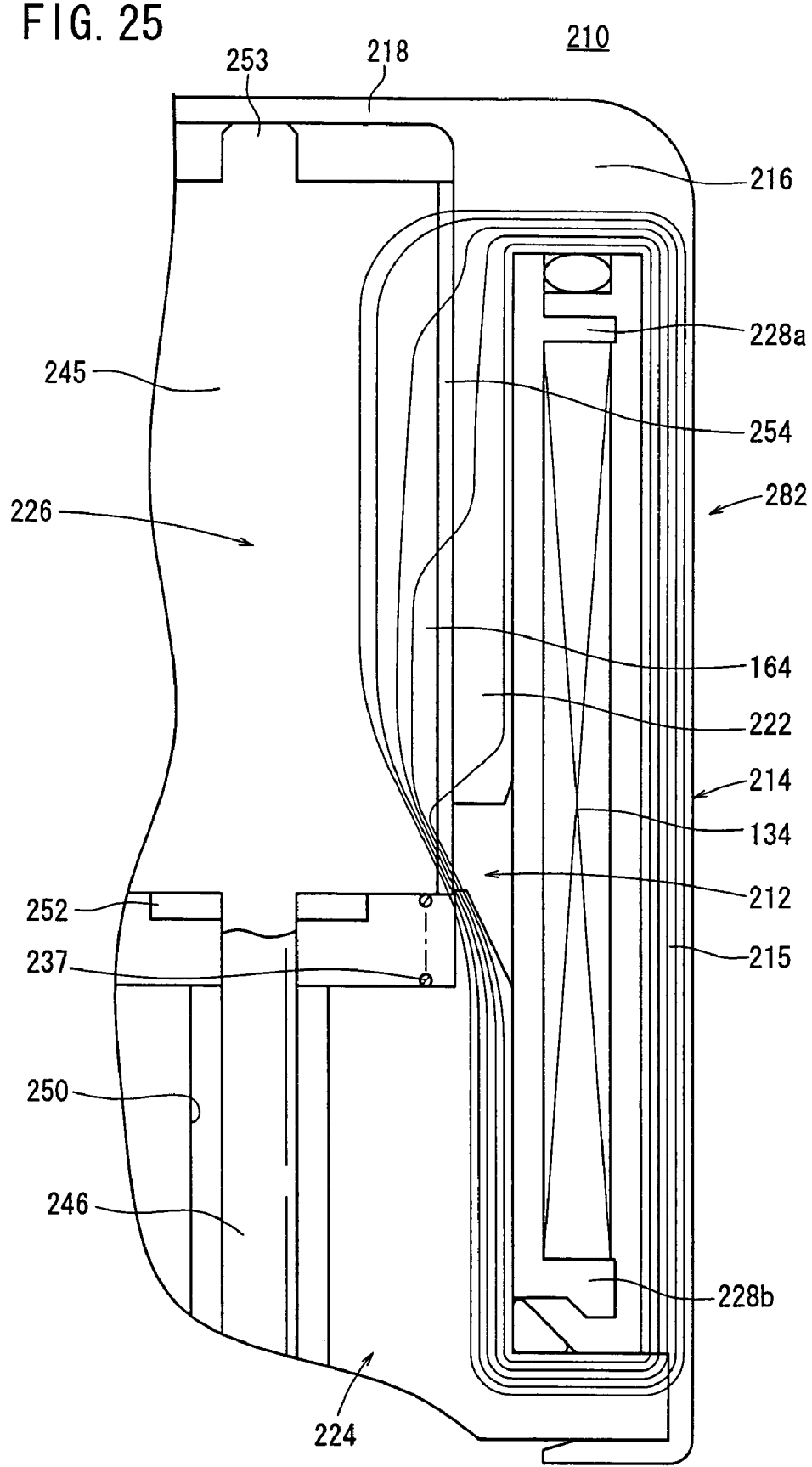
FIG. 25 is an enlarged fragmentary view showing a magnetic circuit of a solenoid.

When the non-illustrated power supply is turned on, the solenoid 212 is energized, producing a magnetic circuit 282 shown in FIG. 25. At this time, electromagnetic forces proportional to the amount of current supplied to the coil 134 are applied to the movable core 226.

Figure 19:
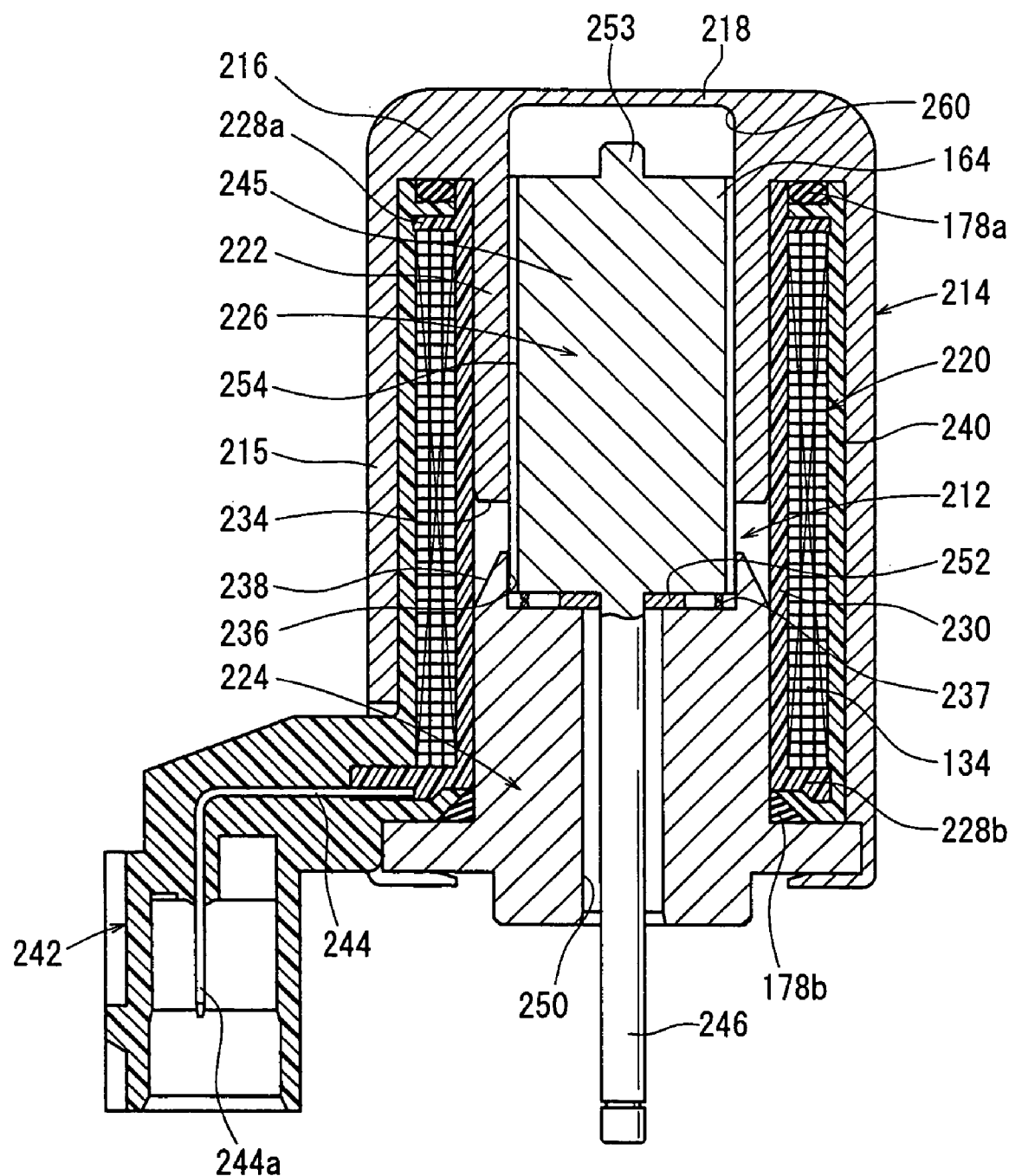
FIG. 19 is a longitudinal cross-sectional view showing the linear electromagnetic actuator illustrated in FIG. 18 which has a movable core and a shaft lifted when a solenoid thereof is energized.

Under the electromagnetic forces generated by the magnetic circuit 282, the movable core 226 and the shaft 246 are displaced downwardly against the resiliency of the return spring 237 (see FIG. 19). When the solenoid 212 is de-energized, the movable core 226 returns to its initial position shown in FIG. 18 under the resiliency of the return spring 237.

In the present embodiment, the protrusion 253 which functions as a stopper is disposed on the end face of the movable core 226 which faces the thin-walled region 218 of the housing 214. The protrusion 253 can also function as a spacer (so-called magnet killer) for preventing residual magnetism from being generated in the solenoid 212.

Specifically, magnetic fluxes are less liable to flow into the thin-walled region 218 of the housing 214, and less liable to flow into the central area of the thin-walled region 218. With the protrusion 253 being disposed centrally on the end face of the movable core 226 which faces the center of the thin-walled region 218, magnetic fluxes are prevented from flowing into the protrusion 253.

The protrusion 253 on the end face of the movable core 226 allows a curved edge 260 to be formed on the inner wall at the bottom of the housing 214 which is engaged by the protrusion 253. Because of the curved edge 260, the housing 214 can be manufactured with ease.

The end face of the movable core 226 which has the protrusion 253 thereon faces the wall surface of the thin-walled region 218 with the protrusion 253 interposed therebetween. Therefore, magnetic fluxes are prevented from flowing from the thin-walled region 218 of the housing 214 into the end face of the movable core 226.

In the present embodiment, furthermore, the outer circumferential surface of the upper end of the movable core 226 is disposed between the bottom 216 of the housing 214 and the tubular yoke 222 at a position which corresponds to the inner wall surface of the bottom 216 of the housing 214 (see an encircled portion A in FIG. 18). Therefore, magnetic fluxes that run from the bottom 216 of the housing 214 to the movable core 226 are also transferred between the inner wall surface of the bottom 216 and the outer circumferential surface of the movable core 226 (see FIG. 25). Therefore, magnetic fluxes are smoothly transferred between the bottom 216 of the housing 214 and the upper end of the movable core 226, so that an increased amount of magnetic fluxes can be generated by the magnetic circuit.

As a result, the solenoid 212 can produce increased attractive forces. If the solenoid 212 is to produce the same attractive forces as a conventional solenoid, then the linear electromagnetic actuator 210 according to the present embodiment can be reduced in overall size.

Other operational details and advantages of the linear electromagnetic actuator 210 according to the present embodiment are identical to those of the electromagnetic actuator 110 according to the preceding embodiment, and will not be described in detail below.

Although certain preferred embodiments of the present invention have been shown and described in detail, it should be understood that various changes and modifications may be made therein without departing from the scope of the appended claims.

What is claimed is:

1. An electromagnetic apparatus comprising:
   an electromagnetic valve including an valve body having an inlet port and an outlet port for passing a fluid under pressure therethrough, and a housing;
   a solenoid having a coil disposed in said housing and wound around a coil bobbin, a yoke joined to an end of said housing, a fixed core, a movable core for being attracted to said fixed core when said coil is energized, and a spring member interposed between said fixed core and said movable core for returning said movable core to an initial position thereof; and
   a valve mechanism having a shaft joined to said movable core for displacement in unison with said movable core, and a valve element for selectively opening and closing a passageway between said inlet port and said outlet port in response to the displacement of said shaft;
   said moveable core having a nonmagnetic layer formed on an outer surface thereof and having a predetermined thickness,
   wherein said yoke has a tubular member and an annular flange, said tubular member surrounding an outer circumferential surface of said movable core and extending axially, said annular flange projecting radially outwardly from of said tubular member, and
   wherein said tubular member has an upper tubular segment extending from said annular flange toward said fixed core and a lower tubular segment extending from said annular flange toward said shaft.

2. An electromagnetic apparatus according to claim 1, wherein the thickness of said nonmagnetic layer is in the range from 10 µm to 30 µm.

3. An electromagnetic apparatus according to claim 1, wherein the thickness of said nonmagnetic layer is in the range from 50 µm to 100 µm.

4. An electromagnetic apparatus according to claim 1, wherein said nonmagnetic layer is fanned by a high-frequency induction hardening process performed on said movable core.

5. An electromagnetic apparatus according to claim 1, wherein said upper tubular segment has an axial length long enough to cover the outer circumferential surface of said movable core regardless of whether said solenoid is energized or de-energized.

* * * * *